「US009036650B2」

(12) United States Patent
Wilson et al.

(10) Patent No.: US 9,036,650 B2
(45) Date of Patent: May 19, 2015

(54) AUTOMATIC LOW NOISE FREQUENCY SELECTION

(75) Inventors: Thomas James Wilson, Pleasanton, CA (US); Christoph Horst Krah, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 1316 days.

(21) Appl. No.: 12/557,814

(22) Filed: Sep. 11, 2009

(65) Prior Publication Data

US 2011/0063993 A1    Mar. 17, 2011

(51) Int. Cl.
| | | |
|---|---|---|
| *H04Q 11/02* | (2006.01) | |
| *G06F 3/044* | (2006.01) | |
| *H04L 27/26* | (2006.01) | |
| *H04M 11/06* | (2006.01) | |

(52) U.S. Cl.
CPC .......... *G06F 3/044* (2013.01); *H04L 27/2626* (2013.01); *H04M 11/062* (2013.01); *H04L 27/2647* (2013.01)

(58) Field of Classification Search
USPC .......................................... 370/430; 345/173
See application file for complete search history.

(56) References Cited

U.S. PATENT DOCUMENTS

| | | | |
|---|---|---|---|
| 3,767,858 | A | 10/1973 | Rodgers |
| 4,080,515 | A | 3/1978 | Anderson |
| 4,293,734 | A | 10/1981 | Pepper, Jr. |
| 4,550,221 | A | 10/1985 | Mabusth |
| 4,560,830 | A | 12/1985 | Perl |
| 4,698,460 | A | 10/1987 | Krein et al. |
| 4,698,461 | A | 10/1987 | Meadows et al. |
| 5,218,174 | A | 6/1993 | Gray et al. |
| 5,475,711 | A | 12/1995 | Betts et al. |
| 5,483,261 | A | 1/1996 | Yasutake |
| 5,488,204 | A | 1/1996 | Mead et al. |
| 5,495,077 | A | 2/1996 | Miller et al. |
| 5,565,658 | A | 10/1996 | Gerpheide et al. |
| 5,606,346 | A | 2/1997 | Kai et al. |
| 5,634,207 | A * | 5/1997 | Yamaji et al. ................. 455/323 |

(Continued)

FOREIGN PATENT DOCUMENTS

| | | |
|---|---|---|
| CN | 1175315 A | 3/1998 |
| CN | 1254902 A | 5/2000 |

(Continued)

OTHER PUBLICATIONS

Chinese Search Report mailed Nov. 24, 2011, for CN Application No. ZL2008201335089, with English Translation, nine pages.

(Continued)

*Primary Examiner* — Phirin Sam
*Assistant Examiner* — Blanche Wong
(74) *Attorney, Agent, or Firm* — Morrison & Foerster LLP

(57) ABSTRACT

Automatic low noise frequency selection for a touch sensitive device is disclosed. A low noise stimulation frequency can be automatically selected by device logic without intervention of the device processor to stimulate the device to sense a touch event at the device. The device logic can automatically select a set of low noise frequencies from among various frequencies based on the amount of noise introduced by the device at the various frequencies, where the frequencies with the lower noise amounts can be selected. The device logic can also automatically select a low noise frequency from among the selected set as the low noise stimulation frequency. The device logic can be implemented partially or entirely in hardware.

25 Claims, 15 Drawing Sheets

(56) References Cited

U.S. PATENT DOCUMENTS

| | | |
|---|---|---|
| 5,691,512 A | 11/1997 | Obi et al. |
| 5,790,106 A | 8/1998 | Hirano et al. |
| 5,825,352 A | 10/1998 | Bisset et al. |
| 5,835,079 A | 11/1998 | Shieh |
| 5,880,411 A | 3/1999 | Gillespie et al. |
| 5,920,309 A | 7/1999 | Bisset et al. |
| 5,945,980 A | 8/1999 | Moissev et al. |
| 5,996,082 A | 11/1999 | Cortopassi |
| 6,025,726 A | 2/2000 | Gershenfeld et al. |
| 6,075,520 A | 6/2000 | Inoue et al. |
| 6,188,391 B1 | 2/2001 | Seely et al. |
| 6,229,856 B1 | 5/2001 | Diab et al. |
| 6,246,729 B1 | 6/2001 | Richardson |
| 6,310,610 B1 | 10/2001 | Beaton et al. |
| 6,323,846 B1 | 11/2001 | Westerman et al. |
| 6,424,094 B1 | 7/2002 | Feldman |
| 6,492,979 B1 | 12/2002 | Kent et al. |
| 6,658,245 B2 | 12/2003 | Li et al. |
| 6,690,387 B2 | 2/2004 | Zimmerman et al. |
| 7,015,894 B2 | 3/2006 | Morohoshi |
| 7,031,886 B1 | 4/2006 | Hargreaves |
| 7,050,046 B1 | 5/2006 | Park et al. |
| 7,129,714 B2 | 10/2006 | Baxter |
| 7,129,939 B2 | 10/2006 | Toyozawa et al. |
| 7,184,064 B2 | 2/2007 | Zimmerman et al. |
| 7,230,609 B2 | 6/2007 | Chao et al. |
| 7,248,625 B2 * | 7/2007 | Chien ............................ 375/219 |
| 7,277,087 B2 | 10/2007 | Hill et al. |
| 7,663,607 B2 | 2/2010 | Hotelling et al. |
| 7,734,261 B2 * | 6/2010 | Bury .......................... 455/115.1 |
| 7,812,827 B2 | 10/2010 | Hotelling et al. |
| 7,876,311 B2 | 1/2011 | Krah et al. |
| 8,120,591 B2 | 2/2012 | Krah et al. |
| 8,175,549 B2 * | 5/2012 | Faust et al. ...................... 455/91 |
| 8,479,122 B2 | 7/2013 | Hotelling et al. |
| 8,493,331 B2 | 7/2013 | Krah et al. |
| 8,754,867 B2 | 6/2014 | Krah et al. |
| 2002/0067845 A1 | 6/2002 | Griffis |
| 2002/0140689 A1 | 10/2002 | Huang et al. |
| 2003/0025676 A1 | 2/2003 | Cappendijk |
| 2003/0048261 A1 | 3/2003 | Yamamoto et al. |
| 2003/0067447 A1 | 4/2003 | Geaghan et al. |
| 2004/0081339 A1 | 4/2004 | Benkley |
| 2004/0227743 A1 | 11/2004 | Brown |
| 2005/0094038 A1 | 5/2005 | Choi et al. |
| 2005/0104867 A1 | 5/2005 | Westerman et al. |
| 2005/0151727 A1 | 7/2005 | Kwong |
| 2006/0022959 A1 | 2/2006 | Geaghan |
| 2006/0026521 A1 | 2/2006 | Hotelling et al. |
| 2006/0097991 A1 | 5/2006 | Hotelling et al. |
| 2006/0114247 A1 | 6/2006 | Brown |
| 2006/0197753 A1 | 9/2006 | Hotelling |
| 2006/0284856 A1 | 12/2006 | Soss |
| 2007/0109274 A1 | 5/2007 | Reynolds |
| 2007/0257890 A1 | 11/2007 | Hotelling et al. |
| 2008/0157882 A1 | 7/2008 | Krah |
| 2008/0157893 A1 | 7/2008 | Krah |
| 2008/0158167 A1 | 7/2008 | Hotelling et al. |
| 2008/0158169 A1 | 7/2008 | O'Connor et al. |
| 2008/0158172 A1 | 7/2008 | Hotelling et al. |
| 2008/0162996 A1 | 7/2008 | Krah et al. |
| 2008/0162997 A1 | 7/2008 | Vu et al. |
| 2008/0309625 A1 | 12/2008 | Krah et al. |
| 2008/0309628 A1 | 12/2008 | Krah et al. |
| 2009/0009483 A1 | 1/2009 | Hotelling et al. |
| 2011/0025634 A1 | 2/2011 | Krah et al. |
| 2011/0042152 A1 * | 2/2011 | Wu ............................ 178/18.03 |
| 2014/0240287 A1 | 8/2014 | Krah et al. |

FOREIGN PATENT DOCUMENTS

| | | |
|---|---|---|
| CN | 1773442 A | 5/2006 |
| CN | 1914585 A | 2/2007 |
| EP | 2 453 341 A1 | 5/2012 |
| GB | 2 451 973 A | 2/2009 |
| GB | 2 451 973 B | 2/2009 |
| JP | 2000-163031 A | 6/2000 |
| JP | 2002-342033 A | 11/2002 |
| KR | 1998-0010726 A | 4/1998 |
| WO | WO-96/18179 A1 | 6/1996 |
| WO | WO-98/02964 A1 | 1/1998 |
| WO | WO-2004/099964 A2 | 11/2004 |
| WO | WO-2008/085416 A1 | 7/2008 |
| WO | WO-2008/085457 A2 | 7/2008 |
| WO | WO-2008/085719 A2 | 7/2008 |
| WO | WO-2008/157245 A2 | 12/2008 |
| WO | WO-2008/157252 A1 | 12/2008 |

OTHER PUBLICATIONS

Examination Report mailed Oct. 15, 2008, for GB Patent Application No. 0808783.5, filed May 15, 2008, two pages.

Final Office Action mailed Feb. 1, 2011, for U.S. Appl. No. 11/818,345, filed Jun. 13, 2007, 20 pages.

GB Search Report mailed Jun. 25, 2012, for GB Patent Application No. GB0808783.5, one page.

International Search Report mailed Oct. 6, 2008, for PCT Application No. PCT/US2008/066759, filed Jun. 12, 2008, three pages.

International Search Report mailed Oct. 30, 2009, for PCT Application No. PCT/US2008/066743, filed Jun. 12, 2008, six pages.

Non-Final Office Action mailed May 10, 2010, for U.S. Appl. No. 11/818,454, filed Jun. 13, 2007, 16 pages.

Non-Final Office Action mailed May 12, 2010, for U.S. Appl. No. 11/818,345, filed Jun. 13, 2007, 27 pages.

Non-Final Office Action mailed Mar. 7, 2011, for U.S. Appl. No. 12/904,012, filed Oct. 13, 2010, 25 pages.

Non-Final Office Action mailed Sep. 8, 2011, for U.S. Appl. No. 12/208,334, filed Sep. 10, 2008, 16 pages.

Non-Final Office Action mailed Aug. 23, 2013, for U.S. Appl. No. 13/916,357, filed Jun. 12, 2013, 17 pages.

Notice of Allowance mailed Sep. 29, 2010, for U.S. Appl. No. 11/818,454, filed Jun. 13, 2007, seven pages.

Notice of Allowance mailed Sep. 22, 2011, for U.S. Appl. No. 12/904,012, filed Oct. 13, 2010, 10 pages.

Notice of Allowance mailed Apr. 8, 2013, for U.S. Appl. No. 11/818,345, filed Jun. 13, 2007, 19 pages.

Notice of Allowance mailed Feb. 6, 2014, for U.S. Appl. No. 13/916,357, filed Jun. 12, 2013, 25 pages.

Search Report mailed Oct. 15, 2008, for GB Patent Application No. 0808783.5, filed May 15, 2008, two pages.

Search Report mailed Apr. 24, 2009, for NL Application No. 2001666, English translation, 12 pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

AUTOMATIC LOW NOISE FREQUENCY SELECTION

FIELD

This relates generally to touch sensitive devices and, more particularly, to touch sensitive devices that perform spectral analysis of noise and automatically select low noise stimulation frequencies to use to detect touch events at the devices.

BACKGROUND

Many types of input devices are presently available for performing operations in a computing system, such as buttons or keys, mice, trackballs, joysticks, touch sensor panels, touch screens and the like. Touch sensitive devices, such as touch screens, in particular, are becoming increasingly popular because of their ease and versatility of operation as well as their declining price. A touch sensitive device can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. The touch sensitive device can allow a user to perform various functions by touching the touch sensor panel using a finger, stylus or other object at a location dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

Typically, the device processor can perform many of the functions associated with recognizing a touch event at the touch sensor panel, even though some of these functions can be relatively simple and/or somewhat time-independent. This can occupy significant processor time, thereby preventing the processor from performing other more complex and/or more time-dependent functions. Additionally, power requirements for the processor can be high such that, the more time that the processor is active, the higher the device power consumption.

SUMMARY

This relates to automatic low noise frequency selection for a touch sensitive device, in which a low noise stimulation frequency can be automatically selected by device logic without intervention by the device processor. The selected low noise frequency can be used for stimulation signals to stimulate the device to recognize a touch event. Frequency selection logic can automatically select a set of low noise frequencies from among various frequencies based on the amount of noise introduced by internal and/or external noise sources at the various frequencies. The frequencies with the lower noise amounts can be selected. Frequency selection logic can also automatically select a particular low noise frequency from among the selected set as the low noise frequency of stimulation signals for stimulating the device to recognize a touch event at the device. The frequency selection logic can be implemented partially or entirely in hardware. The automatic low noise frequency selection can advantageously provide power savings for the touch sensitive device and reduce the processing burden on the device processor by using device logic rather than the device processor for the selection.

DETAILED DESCRIPTION

In the following description of various embodiments, reference is made to the accompanying drawings which form a part hereof, and in which it is shown by way of illustration specific embodiments which can be practiced. It is to be understood that other embodiments can be used and structural changes can be made without departing from the scope of the various embodiments.

This relates to automatic low noise frequency selection for a touch sensitive device, in which a low noise stimulation frequency can be automatically selected by device logic without intervention by the device processor, where the selected low noise frequency can be used for stimulation signals to stimulate the device to sense a touch event at the device. Frequency selection logic can automatically select a set of low noise frequencies from among various frequencies based on the amount of noise introduced by internal and/or external noise sources at the various frequencies, where the frequencies with the lower noise amounts can be selected. Frequency selection logic can also automatically select a particular low noise frequency from among the selected set as the low noise frequency of stimulation signals for stimulating the device to sense a touch event at the device. The frequency selection logic can be implemented partially or entirely in hardware.

The automatic low noise frequency selection can advantageously reduce the processing burden on the device processor and reduce power consumption of the processor and other components in touch sensitive devices, which can result in power savings in the devices. The power savings can be realized in longer battery life, more robust functionalities that consume power, smaller power supplies, and smaller devices.

Although various embodiments can be described and illustrated herein in terms of mutual capacitance touch sensor panels, it should be understood that the various embodiments are not so limited, but can be additionally applicable to self-capacitance sensor panels, and both single and multi-touch sensor panels, and other sensors, in which single stimulation signals can be used to generate a touch signal and in which multiple simultaneous stimulation signals can be used to generate a composite touch signal. Furthermore, although various embodiments can be described and illustrated herein in terms of double-sided ITO (DITO) touch sensor panels, it should be understood that the various embodiments can be also applicable to other touch sensor panel configurations, such as configurations in which the drive and sense lines can be formed on different substrates or on the back of a cover glass, and configurations in which the drive and sense lines can be formed on the same side of a single substrate.

Figure 1:
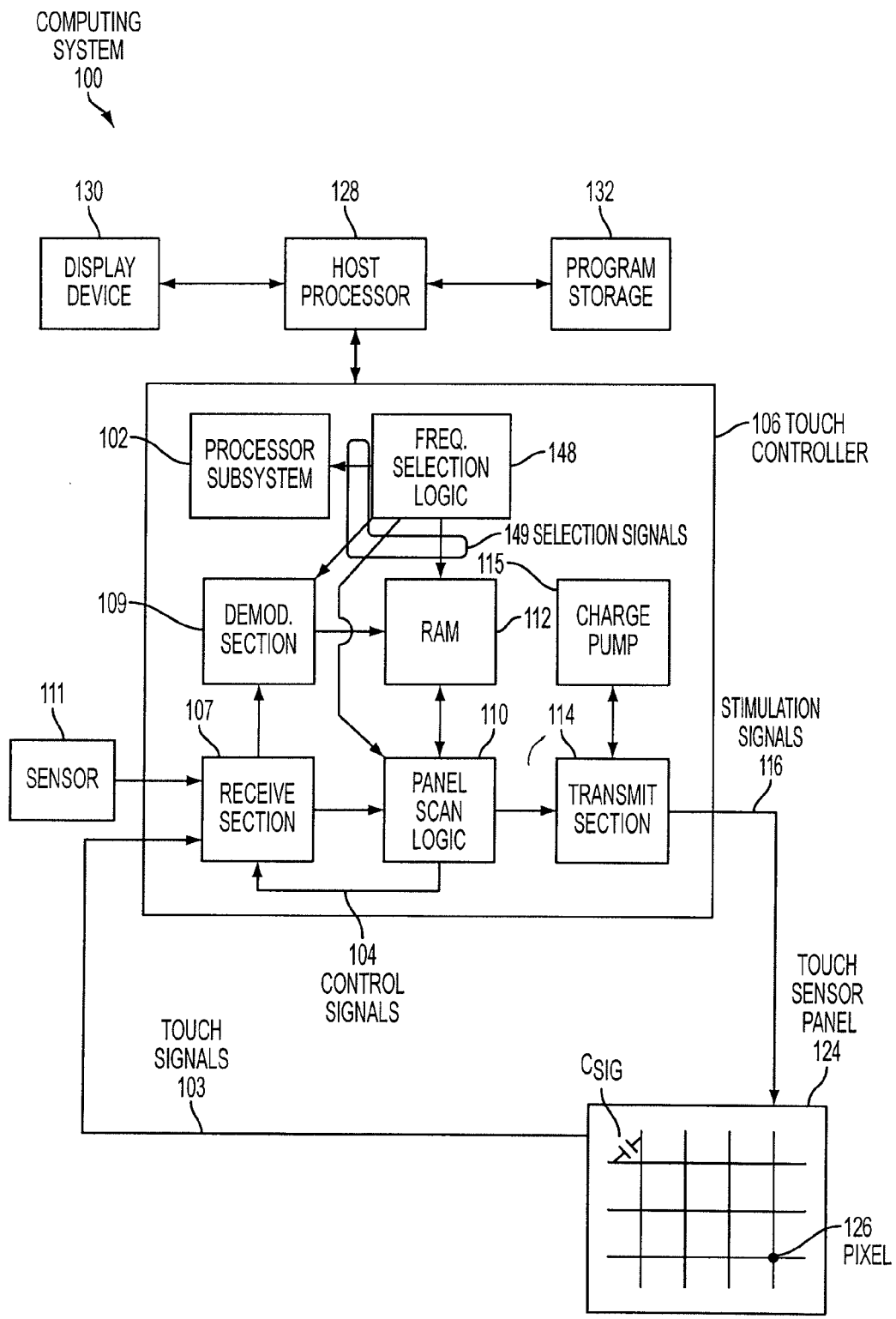
FIG. 1 illustrates an exemplary computing system having automatic low noise frequency selection according to various embodiments.

FIG. 1 illustrates an exemplary computing system having automatic low noise frequency selection according to various embodiments described herein. In the example of FIG. 1, computing system 100 can include touch controller 106. The touch controller 106 can be a single application specific integrated circuit (ASIC) that can include one or more processor subsystems 102, which can include one or more main processors, such as ARM968 processors or other processors with similar functionality and capabilities. However, in other embodiments, the processor functionality can be implemented instead by dedicated logic, such as a state machine. The processor subsystems 102 can also include peripherals (not shown) such as random access memory (RAM) or other types of memory or storage, watchdog timers and the like. The touch controller 106 can also include receive section 107 for receiving signals, such as touch signals 103 of one or more sense channels (not shown), other signals from other sensors such as sensor 111, etc. The touch controller 106 can also include demodulation section 109 such as a multistage vector demodulation engine, panel scan logic 110, and transmit section 114 for transmitting stimulation signals 116 to touch sensor panel 124 to drive the panel. The panel scan logic 110 can access RAM 112, autonomously read data from the sense channels, and provide control for the sense channels. In addition, the panel scan logic 110 can control the transmit section 114 to generate the stimulation signals 116 at various frequencies and phases that can be selectively applied to rows of the touch sensor panel 124.

The touch controller 106 can also include charge pump 115, which can be used to generate the supply voltage for the transmit section 114. The stimulation signals 116 can have amplitudes higher than the maximum voltage the ASIC process can tolerate by cascading transistors. Therefore, using the charge pump 115, the stimulus voltage can be higher (e.g., 6V) than the voltage level a single transistor can handle (e.g., 3.6 V). Although FIG. 1 shows the charge pump 115 separate from the transmit section 114, the charge pump can be part of the transmit section.

Touch sensor panel 124 can include a capacitive sensing medium having row traces (e.g., drive lines) and column traces (e.g., sense lines), although other sensing media can also be used. The row and column traces can be formed from a transparent conductive medium such as Indium Tin Oxide (ITO) or Antimony Tin Oxide (ATO), although other transparent and non-transparent materials such as copper can also be used. In some embodiments, the row and column traces can be perpendicular to each other, although in other embodiments other non-Cartesian orientations are possible. For example, in a polar coordinate system, the sense lines can be concentric circles and the drive lines can be radially extending lines (or vice versa). It should be understood, therefore, that the terms "row" and "column" as used herein are intended to encompass not only orthogonal grids, but the intersecting traces of other geometric configurations having first and second dimensions (e.g. the concentric and radial lines of a polar-coordinate arrangement). The rows and columns can be formed on, for example, a single side of a substantially transparent substrate separated by a substantially transparent dielectric material, on opposite sides of the substrate, on two separate substrates separated by the dielectric material, etc.

At the "intersections" of the traces, where the traces pass above and below (cross) each other (but do not make direct electrical contact with each other), the traces can essentially form two electrodes (although more than two traces can intersect as well). Each intersection of row and column traces can represent a capacitive sensing node and can be viewed as picture element (pixel) 126, which can be particularly useful when the touch sensor panel 124 is viewed as capturing an "image" of touch. (In other words, after the touch controller 106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between row and column electrodes can appear as a stray capacitance Cstray when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which can be a function of Csig.

The touch controller 106 can also include frequency selection logic 148, which can be used to automatically select low noise frequencies for the stimulation signals 116 (and consequently for the touch signals 103). The frequency selection logic 148 can access the processor subsystem 102, the demodulation section 109, the panel scan logic 110, and the RAM 112, autonomously receive data from and send data to these components via, for example, selection signals 149, and use these components when automatically selecting the low noise frequencies for the stimulation signals 116 (and the touch signals 103). The frequency selection logic 148 can be implemented partially or entirely in dedicated logic, such as a state machine. Or the frequency selection logic 148 can be partially or entirely part of or separate from the panel scan logic 110. Or the frequency selection logic 148 can be partially or entirely part of or separate from the processor subsystem 102. The frequency selection logic 148 can be implemented partially or entirely in hardware.

The frequency selection logic 148 can control whether to perform a spectral scan or a touch panel scan of the touch sensor panel 124. The spectral scan can generally be performed to detect the amount of noise introduced by the computing system 100 and/or external noise sources. The touch panel scan can generally be performed to detect a touch event at the touch sensor panel 124. During a spectral scan, no stimulation signal 116 can be applied to the touch sensor panel 124. The sum of the output of all the sense channels can represent the total charge being applied to the touch sensor panel 124, including all detected noise. The summed output can be demodulated at various frequencies and the demodulated outputs used to calculate the magnitudes of the noise at the various frequencies. The lower the magnitude, the lower the noise. Several low noise frequencies can be identified. From among the identified low noise frequencies, one or more can be automatically selected by the frequency selection logic 148 for use in a touch panel scan.

The spectral scan can be performed in steps, where a first step can demodulate the sense channels' summed output at various frequencies within a first range and calculate the noise magnitudes at those frequencies, then a second step can demodulate the summed output at various frequencies within a second range and calculate the noise magnitudes at those frequencies, then a third step can demodulate the summed output at various frequencies within a third range and calculate the noise magnitudes at those frequencies, and so on, generally up to four or five steps. For example, during a first step of the spectral scan, the summed output can be demodulated with frequencies between 100-200 kHz; during a second step, with frequencies between 200-300 kHz; during a third step, with frequencies between 300-400 kHz; and so on. A given number of low noise frequencies can be identified from each frequency range or step. For example, five low noise frequencies can be identified for each step. One or more of the identified low noise frequencies can be selected from among those in a particular step for use in a touch panel scan. Or one or more of the identified low noise frequencies can be selected from among those in all the steps.

During a touch panel scan, stimulation signals 116 having the selected low noise frequencies can drive the touch sensor panel 124, which can generate the touch signals 103 to be processed by the sense channels. The processed touch signals can be demodulated at the selected low noise frequencies and used to determine an image of touch, as described above.

The touch panel scan can also be performed in steps. Each row of the touch sensor panel 124 can be driven with either a positive-phase stimulation signal having the selected low noise frequency (Vstim+), a negative-phase stimulation signal having the selected low noise frequency (Vstim−), or no stimulation signal. Therefore, during each step in the touch panel scan, different combinations of stimulation signals (Vstim+, Vstim−, and/or no Vstim) can be applied to the rows of the touch sensor panel 124. Multiple steps can be performed during the touch panel scan to stimulate all the rows of the touch sensor panel 124 so as to generate sufficient touch signals to accurately identify the touch event.

In general, the spectral scan and the touch panel scan can be performed without intervention by the processor in the subsystems 102 in order to reduce power and to free the processor and other components to perform other tasks. Otherwise, the processor in the subsystems 102 can intervene, for example, when there is a detected touch event or when resolution of adverse noise conditions can benefit from the power and speed of the processor.

Computing system 100 can operate in an auto-scan mode and in an active mode when performing the touch panel scan. Other modes can also operate. Logic for operating in both modes can reside in the panel scan logic 110, separately from the panel scan logic 110, or entirely separate from the system 100. In general, during the auto-scan mode, the computing system 100 can perform the touch panel scan without intervention by the processor in the subsystem 102 in order to conserve power or free up the processor and other components to perform other tasks. The computing system 100 generally operate in the auto-scan mode when there has been no touch event at the touch sensor panel 124 for an extended period of time. The panel scan logic 110 can periodically perform a brief touch panel scan, about 1 ms in some embodiments, while keeping the processor inactive, and can return the system 100 to a low power non-scan state for a time period, about 40-100 ms in some embodiments, if the scan does not detect a touch event. If the scan does detect a touch event, the computing system 100 can change to the active mode. During the active mode, the panel scan logic 110 can perform a longer touch panel scan, about 10 ms in some embodiments, during which the processor can actively process touch signals generated during the scan to indicate a touch event. The panel scan logic 110 can return the system 100 to a low power non-scan state for a time period, about 6 ms in some embodiments, during which the processor can wait for an interrupt to perform another touch panel scan or some other function. After a period during which no further touch events occur, the computing system 100 can return to the auto-scan mode. During both modes, the system 100 can also perform the spectral scan.

The frequency selection logic 148 can output signals to the panel scan logic 110 and to the processor of the subsystems 102 to initiate the different modes and/or the different scans, as will be described below.

Computing system 100 can also include host processor 128 for receiving outputs from the processor subsystems 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The host processor 128 can also perform additional functions that may not be related to panel processing, and can be coupled to program storage 132 and display device 130 such as an LCD display for providing a UI to a user of the device. In some embodiments, the host processor 128 can be a separate component from the touch controller 106, as shown. In other embodiments, the host processor 128 can be included as part of the touch controller 106. In still other embodiments, the functions of the host processor 128 can be performed by the processor subsystem 102 and/or distributed among other components of the touch controller 106. The display device 130 together with the touch sensor panel 124, when located partially or entirely under the touch sensor panel or when integrated with the touch sensor panel, can form a touch sensitive device such as a touch screen.

Note that one or more of the functions described above can be performed, for example, by firmware stored in memory (e.g., one of the peripherals) and executed by the processor subsystem 102, or stored in the program storage 132 and executed by the host processor 128. The firmware can also be stored and/or transported within any computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the touch sensor panel is not limited to touch, as described in FIG. 1, but can be a proximity panel or any other panel according to various embodiments. In addition, the touch sensor panel described herein can be either a single-touch or a multi-touch sensor panel.

It is further to be understood that the computing system is not limited to the components and configuration of FIG. 1, but can include other and/or additional components in various configurations capable of automatic low noise frequency selection according to various embodiments.

Figure 2A:
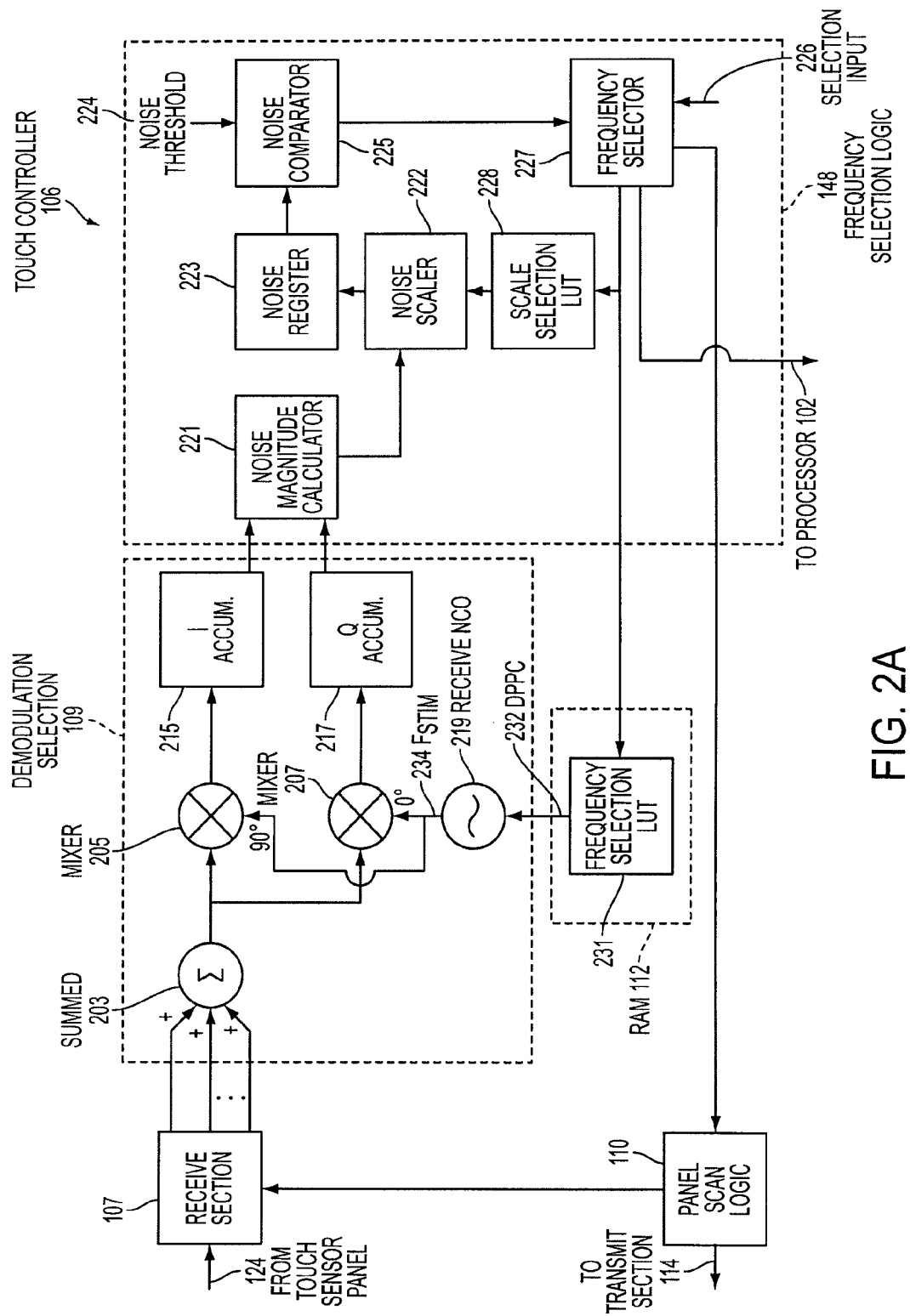
FIGS. 2a-2c illustrate exemplary circuits for automatic low noise frequency selection according to various embodiments.

FIG. 2a illustrates an exemplary circuit for automatic low noise frequency selection according to various embodiments. In the example of FIG. 2a, receive section 107 of touch controller 106 can include sense channels (not shown) to receive and process touch signals indicative of a touch event at touch sensor panel 124. The receive section 107 can output the processed touch signals. The demodulation section 109 of the touch controller 106 can include summer (or summing circuit) 203, mixers 205 and 207, in-phase (I) accumulator 215, quadrature (Q) accumulator 217, and receive numerically controlled oscillator (NCO) 219. The summer 203 can sum the processed touch signals outputted by the sense channels. The mixer 205 can demodulate the output of the summer 203 with an in-phase (I) frequency component of demodulation waveform Fstim 234 to determine an amount of noise in the output at that demodulation frequency. In some embodiments, Fstim 234 can be an envelope shaped digitally synthesized sine wave, such as a rectangular, Chebychev, Gaussian, etc., waveform, depending on the frequency response desired. The mixer 207 can also demodulate the output of the summer 203 with a quadrature (Q) frequency component of Fstim 234 to determine an amount of noise in the output at that demodulation frequency. The mixers 205, 207 can have a bandpass filter response. The envelope (or window) of Fstim 234 can be selected to reduce the stopband ripple of the bandpass response. The in-phase (I) accumulator 215 can accumulate the in-phase noise component from the mixer 205. The quadrature (Q) accumulator 217 can accumulate the quadrature noise component from the mixer 207. The receive NCO 219 can receive a numerical control input to set the demodulation frequency of Fstim 234. The numerical control input can be DPPC 232, which can represent a phase increment proportional to the demodulation frequency of Fstim 234 outputted by the receive NCO 219.

Frequency selection logic 148 of the touch controller 106 can include noise magnitude calculator 221, noise scaler 222, noise register 223, noise comparator 225, noise scale selection LUT 228, and frequency selector 227. The noise magnitude calculator 221 can connect to the in-phase accumulator 215 and the quadrature accumulator 217 to calculate the noise magnitude from the in-phase and quadrature noise components. In some embodiments, the noise magnitude calculator 221 can calculate the noise magnitude as the square root of the sum of the squares of the in-phase and quadrature components. In some embodiments, the noise magnitude calculator 221 can calculate the noise magnitude as the sum of the squares of the in-phase and quadrature components. Other calculations can also be used. For example, the noise magnitude Nnz can be calculated as follows.

$$N_{NZ}(\omega_D) = S_{NZ} \cdot \sqrt{N_I^2(\omega_D) + N_Q^2(\omega_D)} \quad (1)$$

where $N_{NZ}(\omega_D)$=the noise at demodulation frequency $\omega_D$; $N_I(\omega_D)$=the demodulated and accumulated in-phase result at $\omega_{STM}$; $N_Q(\omega_D)$=the demodulated and accumulated quadrature result at the demodulation frequency $\omega_D$ in radians; and $S_{NZ}$=the noise scale factor.

The noise source at the output of a sense channel can be calculated as follows.

$$N_{NZ}(\omega_D,t) = N_{NZ0} \cdot H_{RX}(\omega_D) \cdot \sin(\omega_D \cdot t + \phi_{NZ}) \quad (2)$$

where $N_{NZ0}$=the noise amplitude; $H_{RX}(\omega_D)$=the transfer function representing the attenuation of the noise by the sense channel at the demodulation frequency $\omega_D$; $\phi_{NZ}$=the phase of the noise relative to the demodulation signal; and t=the time expressed as increments N of ADC clock periods $$\left(\frac{N}{f_{ADC\_CLK}}\right)$$

at which the incoming noise can be sampled by the ADC.

The in-phase portion of the demodulation waveform $N_{DI}(\omega_D)$ can be calculated as follows:

$$N_{DI}(\omega_D) = N_{D0} \cdot H_{RX}(\omega_D) \cdot W_D(t) \cdot \sin(\omega_D \cdot t) \quad (3)$$

Similarly, the quadrature portion of the demodulation waveform $N_{DQ}(\omega_D)$ can be calculated as follows:

$$N_{DQ}(\omega_D, t) = N_{D0} \cdot H_{RX}(\omega_D) \cdot W_D(t) \cdot \sin\left(\omega_D \cdot t + \frac{\pi}{2}\right) \quad (4)$$

where $N_{D0}$=the amplitude of the demodulation waveform, expressed in analog-to-digital (ADC) codes.

With the substitution $$t = \frac{N}{f_{ADC\_CLK}}$$

the demodulation process for the in-phase component $N_I(\omega_C)$ and the quadrature component $N_Q(\omega_C)$ can be represented as follows.

$$N_I(\omega_C) = \sum_{N=1}^{N_{INT}} (N_{DI}(\omega_C, N) \cdot N_{NZ}(\omega_C, N)), \quad (5)$$

$$N_Q(\omega_C) = \sum_{N=1}^{N_{INT}} (N_{DQ}(\omega_C, t) \cdot N_{NZ}(\omega_C, t)) \quad (6)$$

where Nint=the number of integration samples.

Combining Equations (2), (3), and (5) and simplifying the resulting equation can approximate the in-phase component as follows.

$$N_I(\omega_D) = N_{NZ0} \cdot G_D \cdot H_{RX}(\omega_D) \cdot \cos(\omega_{NZ}) \quad (7)$$

where $G_D$=the demodulation gain which can be proportional to the average of the absolute value of the demodulation waveform of Equation (3). Similarly, combining Equations (2), (4), and (6) and simplifying the resulting equation can approximate the quadrature component as follows.

$$N_Q(\omega_D) = -N_{NZ0} \cdot N_{DG} \cdot H_{RX}(\omega_D) \cdot \sin(\phi_{NZ}). \quad (8)$$

Combining Equations (1), (7), and (8) and simplifying the resulting equation can approximate the noise magnitude Nnz as follows.

$$N_{NZ} = N_{Z0} \cdot G_D \cdot H_{RX}(\omega_D) \cdot S_{HRX} \sqrt{\sin^2(\omega_{NZ}) + \cos^2(\phi_{NZ})}. \quad (9)$$

The noise magnitude $N_{NZ}$ can be independent of the phase $\phi_{NZ}$ because the term $\sqrt{\sin^2(\phi_{NZ}) + \cos^2(\phi_{NZ})}$ can always be 1. Therefore the noise magnitude can be calculated as follows.

$$N_{NZ} = N_{Z0} \cdot G_D \cdot H_{RX}(\omega_D) \cdot S_{NZ}. \quad (10)$$

The noise scaler 222 can receive the calculated noise magnitude from the noise magnitude calculator 221 for scaling the magnitude with noise scale factor 229 from the noise scale selection LUT 228. The noise scale factor 229 can be selected from the noise scale selection LUT 228 based on low noise frequency data outputted by the frequency selector 227. Table 1 illustrates an example noise scale selection LUT 228 as follows.

TABLE 1

Example of noise scale selection lookup table

| DPPC[1] | SNZ[1] |
|---|---|
| DPPC[2] | SNZ[2] |
| . | . |
| . | . |
| . | . |
| DPPC[M] | SNZ[M] | where DPPC=the numerical control input to the receive NCO that can represent a phase increment proportional to the low noise frequency; SNZ=the noise scale factor; and M=an integer.

The noise register 223 can receive the calculated noise magnitude from the noise magnitude calculator 221 for temporary storage. The noise comparator 225 can access the noise register 223 to compare the calculated noise magnitude to noise threshold 224. The noise threshold 224 can be static, dynamic, or a combination thereof, depending on the needs of the controller 106.

The frequency selector 227 can receive the result of the comparison between the noise magnitude and the noise threshold 224 from the comparator 225 and can receive various selection input(s) 226 from other components. The comparison result and the selection inputs can be used for automatically selecting low noise frequencies to be used to stimulate the touch sensor panel 124 to generate the touch signals subsequently received by receive section 107. An example of the selection input(s) 226 can include the mode in which the frequency selector 227 is to operate. For example, in a first mode, the processor in the subsystem 102 can be interrupted after a spectral scan is completed and before a touch panel scan is initiated by the processor. The processor can select a frequency that can yield the lowest noise values. Upon selecting the appropriate low noise frequency, the processor can initiate a touch panel scan at the selected low noise frequency. Alternately, the processor can determine that the noise level across the selected frequency range is too high and can initiate another spectral scan to identify low noise frequencies, for example. The first mode can establish a firmware-based approach to find suitable touch scan frequencies.

In a second mode, the frequency selector 227 can automatically select frequencies that can yield the lowest noise values upon completion of a spectral scan and then autonomously initiate a touch panel scan without intervention from the processor.

In a third mode, the frequency selector 227 can automatically select low noise frequencies upon completion of a spectral scan and then interrupt the processor if the lowest noise level exceeds a certain programmable threshold. The processor can then initiate another spectral scan to find low noise frequencies. If the lowest noise level does not exceed the threshold, the frequency selector 227 can autonomously initiate a touch panel scan at the selected low noise frequency without intervention from the processor.

In a fourth mode, the frequency selector 227 can automatically select low noise frequencies upon completion of a spectral scan and then interrupt the processor if the number of noise levels exceeding the threshold reaches a certain count. If the number of noise levels does not reach the count, the frequency selector 227 can initiate a touch panel scan at the selected low noise frequency without intervention from the processor.

Other examples of the selection input(s) 226 can include a bit associated with whether automatic low noise frequency selection is to be performed during the selected mode (for example, bit=0 to skip automatic frequency selection as in the first and fourth modes and bit=1 to perform automatic frequency selection as in the second and third modes), the frequency selection LUT address of the last DPPC value, and the maximum number of acceptable noisy channels.

The frequency selector 227 can output various interrupt flags to the processor in the subsystems 102 to cause the processor to wake up and initiate a spectral scan or a touch panel scan (such as in active mode). Examples of the interrupt flags can include a flag indicating that the noise level is too high (e.g., as determined by output from the noise comparator 225) for triggering the processor to initiate a spectral scan of the touch sensor panel to find new low noise frequencies, a flag indicating that the number of noisy sense channels exceeds a particular threshold for triggering the processor to initiate a spectral scan of the touch sensor panel to find new low noise frequencies, or a flag for triggering the processor to initiate a touch panel scan. The frequency selector 227 can also output a signal to the panel scan logic 110 to perform a spectral scan or a touch panel scan (such as in either auto-scan or active mode).

In some embodiments, the frequency selector 227 can include a noise statistic circuit (not shown) to monitor the number of high noise channels and to raise the interrupt flag indicating that the number of noisy channels exceeds the particular threshold. Alternatively, the noise statistic circuit can monitor particular noise components for each channel and raise an interrupt flag when a particular noise component of one or more channels exceeds a particular threshold.

Frequency selection LUT 231 can connect to the frequency selector 227 to populate the LUT with low noise frequency data. Table 2 illustrates an example frequency selection LUT 231 as follows.

TABLE 2

Example of frequency selection lookup table

DPPC[1]
DPPC[2]
.
.
.
DPPC[M]

where DPPC=the numerical control input to the receive NCO that can represent a phase increment proportional to the low noise frequency; and M=any integer. In some embodiments, the frequency selection LUT 231 can allocate the DPPC values to different spectral scan steps. For example, DPPC values [1] thru [5] can represent five low noise frequencies between 100-200 kHz found during a spectral scan, where DPPC[1] can represent the lowest noise frequency in that range, DPPC[2] can represent the next lowest noise frequency in that range, DPPC[3] can represent the middle low noise frequency in that range, DPPC[4] can represent the next to highest low noise frequency in that range, and DPPC[5] can represent the highest of the low noise frequencies in that range. Similarly, DPPC values [6] through [10] can represent five low noise frequencies between 200-300 kHz found during the spectral scan and so on. In some embodiments, to automatically select a low noise frequency, selection can be limited to those DPPC values in one or more particular steps, i.e., in particular frequency range(s), if the operating range(s) of the device is known, for example. In some embodiments, to automatically select a low noise frequency, selection can be made from all M DPPC values. The frequency selection LUT 231 can be stored in the RAM 112, for example.

Although the example frequency selection LUT illustrates DPPC values, it is to be understood that other data associated with low noise frequencies can also be stored in the LUT and used, including the low noise frequency values themselves.

The panel scan logic 110 can access RAM 112, autonomously read data from the receive section 107, and provide control for the receive section 107 and the transmit section 114. For example, the panel scan logic 110 can receive a signal from the frequency selector 227 to perform a spectral scan or a touch panel scan.

Figure 2B:
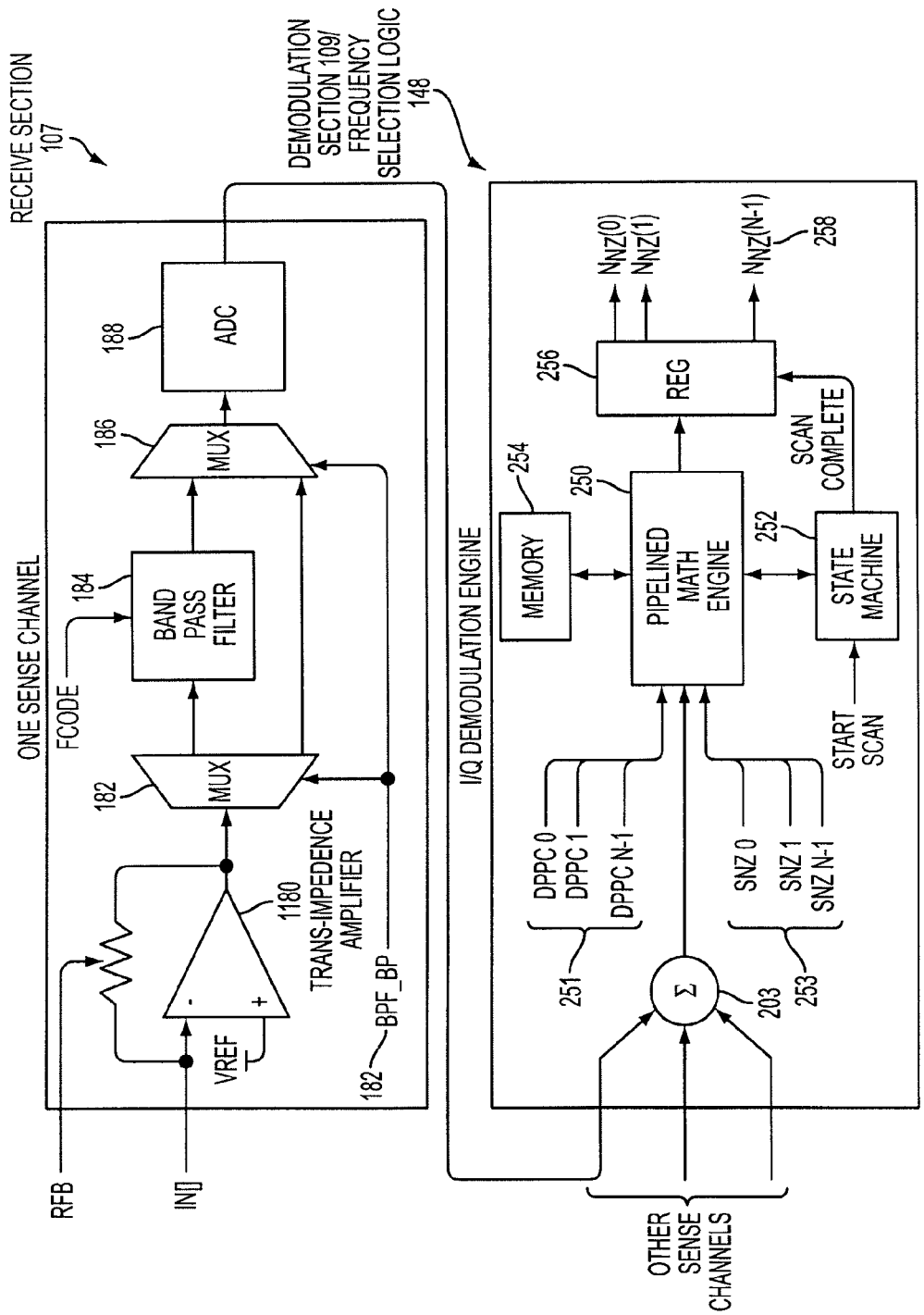

FIG. 2b illustrates an exemplary portion of a touch controller according to various embodiments. In the example of FIG. 2b, the touch controller portion can be used for determining multiple noise levels based on phase increments and associated noise scale factors, as represented in Equation (10) above. A sense channel in receive section 107 of touch controller 106 can include transimpedance amplifier 180, bandpass filter 184, multiplexors 182, 186, and receive analog-to-digital converter (ADC) 188. The amplifier 180 can receive touch signal inputs from the touch sensor panel 124 to convert into a voltage signal. The output of the amplifier 503 can either feed or bypass the bandpass filter 184 via the multiplexors 182, 186. When fed to the filter 184, noise components in the output that are outside a particular band, e.g., components far from the fundamental frequency of the signal, can be rejected. Bypass signal 182 can selectively control whether the filter 182 is bypassed. Either the output of the bandpass filter 182 or the bypassed output can be fed to the receive ADC 188 to convert to a digital signal, which can be sent from the receive section 107 to the demodulation section 109 for further processing.

An in-phase and quadrature frequency modulation engine having components in the demodulation section 109 and the frequency selection logic 148 can include summer 203, pipelined math engine 250, memory 254, state machine 252, and noise register 256, for determining an amount of noise in the touch signals from the sense channels. The summer 203 can sum the processed touch signals outputted by the sense channels. The pipelined math engine can include a multiplier, an accumulator, and a square root calculator (not shown) for demodulating, scaling, and squaring the output of the summer 203. The multiplier can demodulate the output signal from the summer 203 with an in-phase (I) frequency component and a quadrature (Q) frequency component of a demodulation waveform having phase increments DPPC[0] through DPPC[N−1], where N can be an integer. The multiplier can also scale the demodulated signal using scale factors Snz[0] through Snz[N−1]. The multiplier can then square the scaled signal. The accumulator can accumulate the demodulated, scaled in-phase and quadrature components and the phase increments. The square root calculator can perform a magnitude vector calculation. In some embodiments, the math engine can use a single multiplier, accumulator, and square root calculator, such that the engine can be small.

The memory 154 can communicate with the math engine 250 to store intermediate calculations from the math engine and other data, for example. The state machine 252 can manage various operations performed by the math engine 250 and can initiate management of the math engine at the beginning of a spectral scan upon receipt of a start_scan signal. After the spectral scan completes, the state machine 252 can assert a scan_complete signal, at which the math engine 250 can transmit determined noise values Nnz[0] through Nnz[N−1] to the register 256 for temporary storage.

Since noise frequencies can be determined concurrently, a feedback resistor (Rfb) for the amplifier 180 in a sense channel can be chosen that is the same for all frequencies 0 to N−1 covered during an individual spectral scan.

A scale value Snz[0] through Snz[N−1] can be chosen to account for the gain of the sense channel at a particular frequency. The transfer function Hrx of a sense channel can be represented as follows.

$$H_{RX}(\omega_D) = H_{TIA}(\omega_D) \cdot H_{BPF}(\omega_D) \cdot H_{ADC}(\omega_D) \quad (11)$$

where $H_{RX}(\omega_D)$=the gain of the sense channel at frequency $\omega_D$; $H_{TIA}(\omega_D)$=the gain of the transimpedance amplifier at frequency $\omega_D$; $H_{BPF}(\omega_D)$=the gain of the bandpass filter at frequency $\omega_D$; and $H_{ADC}(\omega_D)$=the gain of the ADC at frequency $\omega_D$.

The feedback resistor and the bandpass filter can be selected at a calibrated scan frequency $\omega_{CAL}$ that can yield a channel gain of 1. For a given scan frequency $\omega_{SEL}$, a scale factor Snz_sel can be calculated as follows.

$$S_{NZ\_SEL} = \frac{1}{H_{RX}(\omega_{SEL})}. \quad (12)$$

In some embodiments, a frequency-independent channel gain can prevent the touch signal from losing dynamic range across a certain frequency range. In some embodiments, a bypassed bandpass filter can avoid substantial attenuation of the noise signal across a certain frequency range. A bandpass bypass signal can be asserted to eliminate gain variation across a certain frequency range.

Figure 2C:
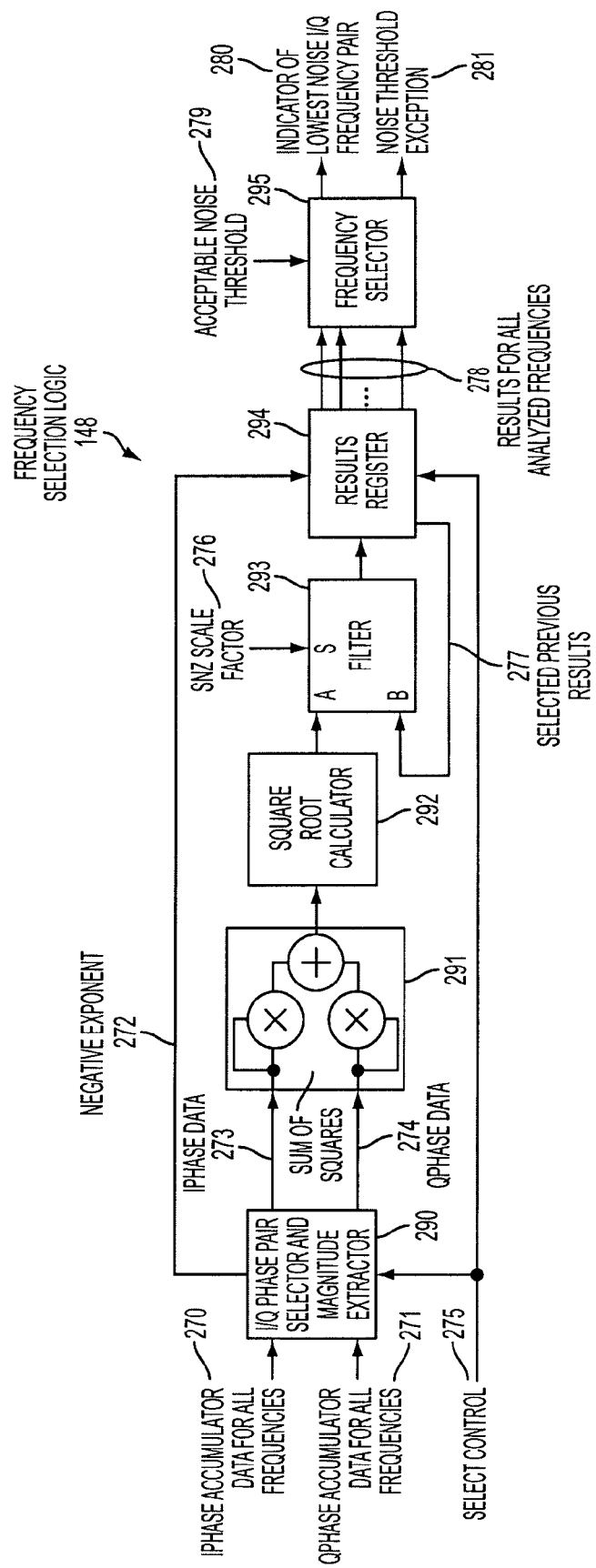

FIG. 2c illustrates an exemplary portion of a touch controller according to various embodiments. In the example of FIG. 2c, the touch controller portion can be used for selecting a lowest noise in-phase (I) and quadrature (Q) frequency pair. The portion can be an exemplary portion of frequency selection logic 148. In-phase and quadrature frequency pair selector and magnitude extractor 290 can receive accumulated in-phase data for several frequencies 270 and accumulated quadrature data for those several frequencies 271 from demodulation section 109. The selector/extractor 290 can extract the in-phase magnitude data 273 and the quadrature magnitude data 274 from the most significant bits of the accumulated inputs indicative of the noise component of the inputs. The selector/extractor 290 can also extract negative exponent 272, which can be associated with the position of the most significant bit of the data. Since the negative exponent 272 can be unaffected by subsequent processing, the exponent can bypass the processing and be stored in results register 294.

Summer 291 can add the squares of the extracted magnitude data. Square root calculator 292 can calculate the square root of the sum. Low pass filter 293 can filter the square root output using feedback noise values 277 and noise scale factor Snz 276, where the filter output can be S*A+(1−S)*B, with S=the scale factor, A=the square root output, and B=the feedback noise value. The filter 293 can reduce the effects of rapid noise changes in the signal. The filtered noise values and the negative exponent 272 can be stored in results register 294. Select control 275 can select which frequency to process at the selector/extractor 290 and can indicate at the results register 294 the corresponding noise values to send to frequency selector 295. The select control 275 can repeat this for multiple frequencies, such that a group of noise values can be sent to the frequency selector 295 during a spectral scan. Alternatively, the in-phase and quadrature frequency pairs can be processed in parallel (or pipelined) such that the select control 275 can be omitted. The frequency selector 295 can determine the lowest of the frequency pairs. The lowest noise frequency pair 280 can be used for a touch panel scan. If none of the selected frequency pairs are lower than noise threshold 279, the frequency selector 281 can assert a noise threshold exception 281, indicative of an unacceptable level of noise in the selected frequency pairs, which can cause the processor to wake up to perform a spectral scan, select new frequency pairs, and so on.

It is to be understood that the touch controller is not limited to the components, configuration, and operation described here in FIGS. 2a-2c, but can include other and/or additional components, configurations, and/or operations capable of automatic low noise frequency selection according to various embodiments.

Figure 3:
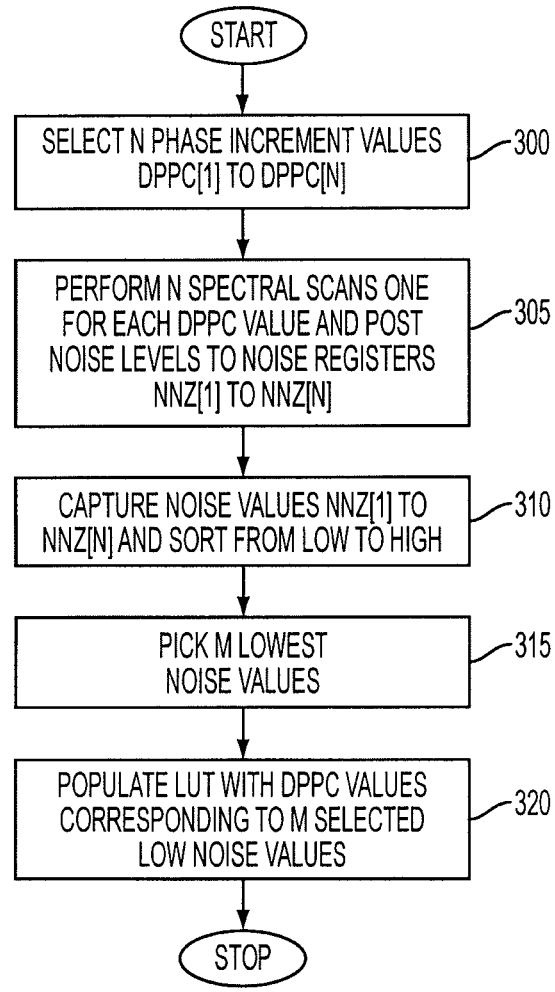
FIG. 3 illustrates an exemplary method for setting up a lookup table used for automatic low noise frequency selection according to various embodiments.

FIG. 3 illustrates an exemplary method for setting up a frequency selection LUT according to various embodiments. In the example of FIG. 3, a set of N frequencies and their corresponding phase increment (DPPC) values can be selected from various frequencies, where N can be any integer (300). Spectral analysis can be performed for each DPPC value, where one or more spectral analyses can be performed during a single spectral scan, and N calculated noise magnitudes can be stored in noise registers for further processing when the scan completes (305). For each of the N selected DPPC values, the corresponding frequency can be used to demodulate summed signals to acquire in-phase and quadrature noise components and the noise magnitudes of the in-phase and quadrature noise components (Nnz) can be calculated. The calculated noise magnitudes can be sorted from low to high (310). The M lowest noise magnitudes can be selected, where M can be any integer less than or equal to N (the total number of DPPC values initially selected) (315). In some embodiments, M can be a predetermined number, e.g., set by the user, set based on the size of the frequency selection LUT, or set based on a noise threshold. In some embodiments, M can be dynamically determined, e.g., set as the number of noise magnitudes below a threshold, for example, as defined by a histogram. The frequency selection LUT can be populated with the M DPPC values corresponding to the M selected low noise magnitudes (320). In some embodiments, the M DPPC values can be allocated to spectral scan steps. This method can be performed in auto-scan or active mode, as well as other modes capable of performing automatic low noise frequency selection according to various embodiments.

Figure 4:
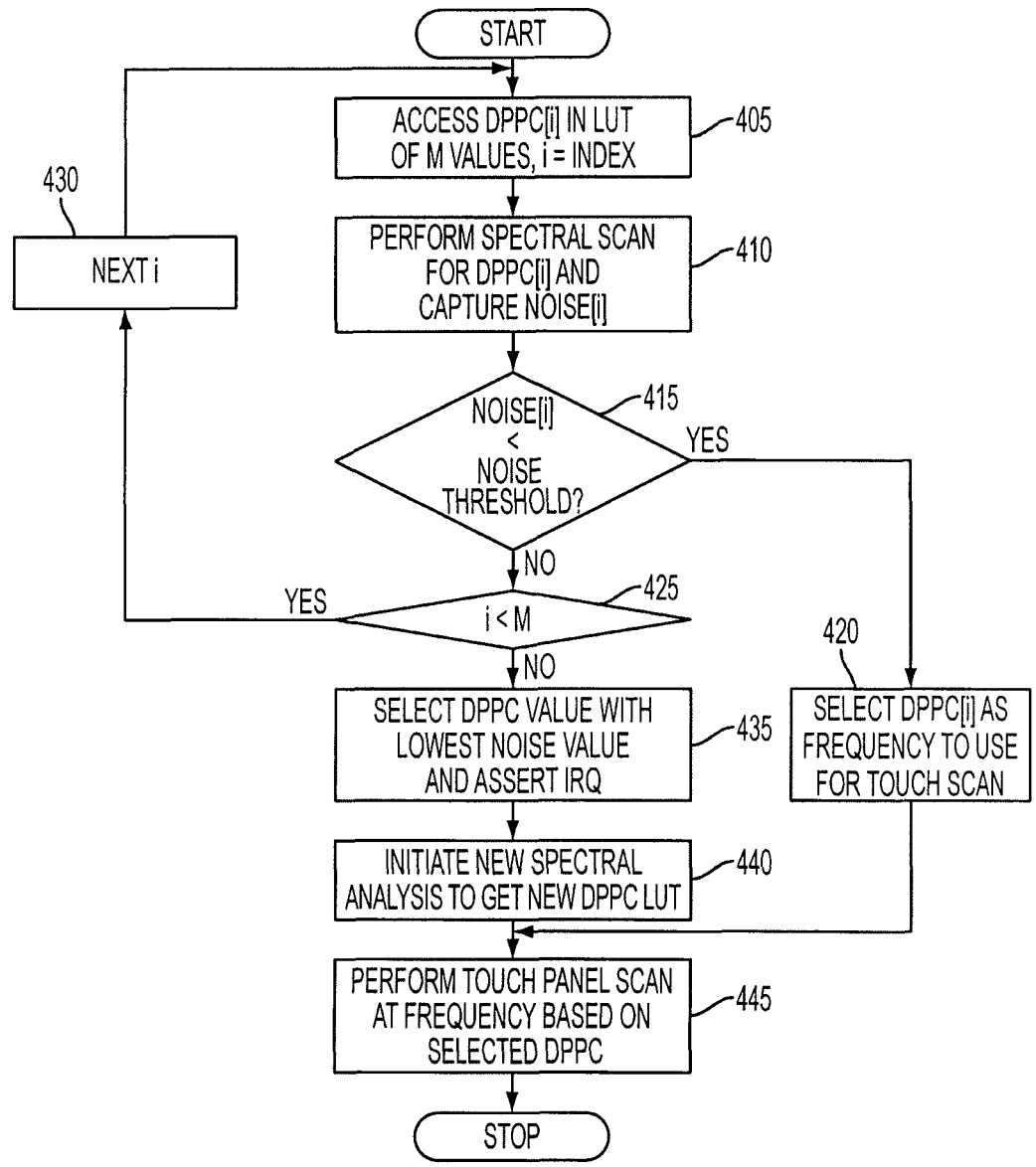
FIG. 4 illustrates an exemplary method for automatic low noise frequency selection according to various embodiments.

FIG. 4 illustrates an exemplary method for automatic low noise frequency selection according to various embodiments. In the example of FIG. 4, one of M DPPC values from the frequency selection LUT can be accessed (405). The frequency corresponding to the accessed DPPC value can be used to perform a spectral scan for the frequency associated with the DPPC value to capture a noise magnitude (410). A determination can be made whether the noise magnitude is less than a noise threshold (415). If so, that DPPC value and its corresponding frequency can be selected to use during the touch panel scan (420). A touch panel scan can be performed at the frequency generated from the selected DPPC value (445). If the noise magnitude is not less than the noise threshold (415), a determination can be made whether all the DPPC values in the LUT have been used, as in (405)-(410), to determine a low noise frequency (425). If not, the above (405)-(410) can be repeated using another DPPC value in the LUT. If all the DPPC values have been used and a low noise frequency below the noise threshold has not been found (425), the DPPC value and its corresponding frequency having the lowest of the noise magnitudes can be selected (435). Since a suitable low noise frequency was not found, a new spectral scan can be initiated to find new DPPC values to populate the LUT (for example, using the method of FIG. 3) in order to find a low noise frequency (440). A touch panel scan can be performed at the frequency generated from the selected DPPC value (445). This method can be performed in auto-scan or active mode, as well as other modes capable of performing automatic low noise frequency selection according to various embodiments.

In an alternate method, a spectral scan can be performed in a pipeline fashion such that each spectral scan (410) can yield multiple noise magnitude values based on multiple DPPC values selected from the M-deep LUT.

In another alternate method, rather than selecting the first noise magnitude found that is less than the noise threshold (415), the method can select the lowest of all the noise magnitudes less than the noise threshold and select the DPPC value and its corresponding frequency that correspond to that lowest noise threshold to use during the touch panel scan (445).

In another alternate method, rather than selecting a DPPC value from among all the DPPC values, a DPPC value from among the DPPC values in a particular step can be selected, such as the spectral scan step corresponding to the known operating range of the device.

In another alternate method, prior to the touch panel scan, the noise magnitude values can be periodically reordered from high to low. This reordering can advantageously minimize the number of spectral scans to find a low noise magnitude value. The decision to perform the reordering can be a function of the number of iterations to find a low noise magnitude compared to an iteration count threshold, for example.

Figure 5:
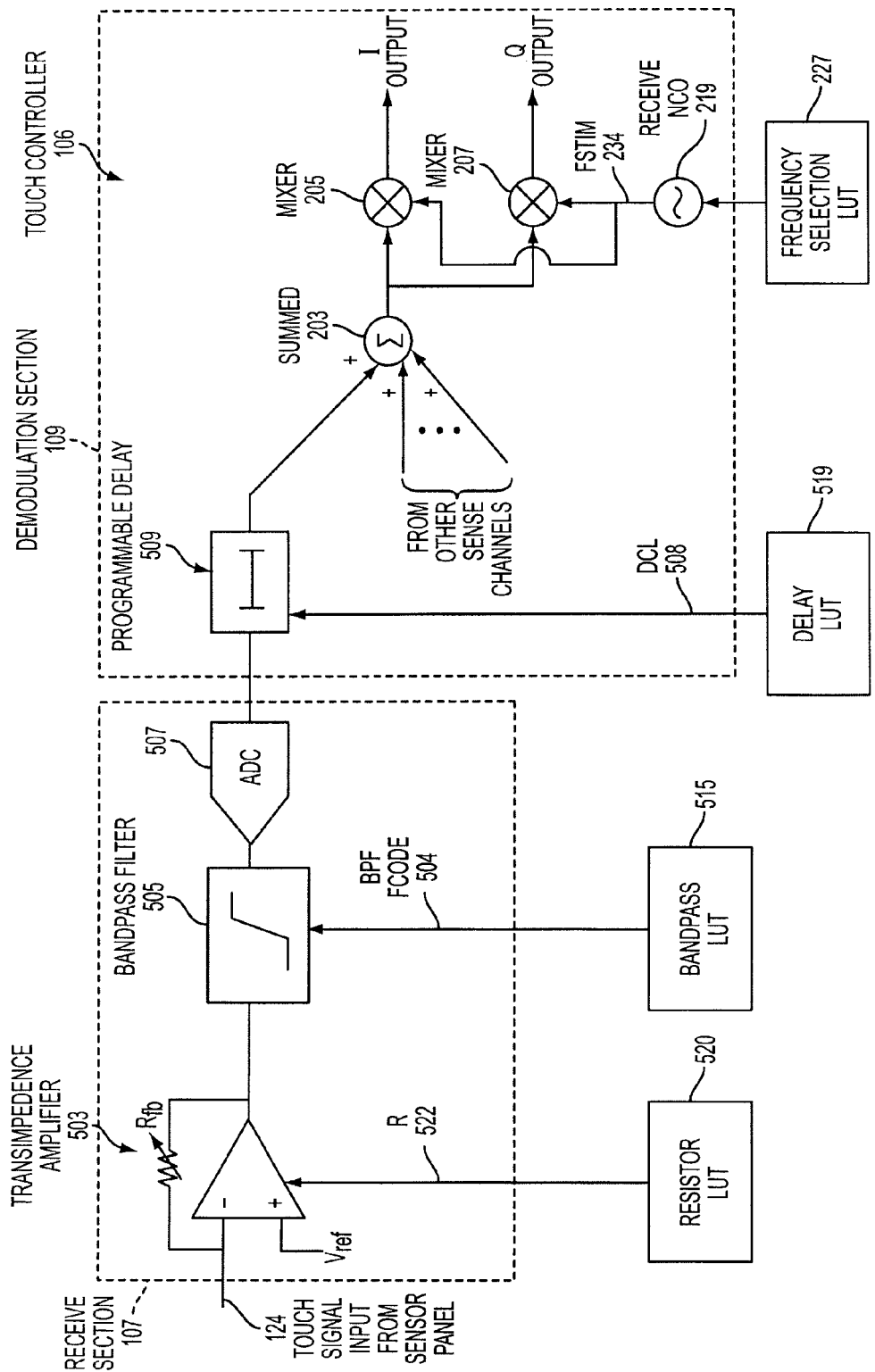
FIG. 5 illustrates an exemplary circuit for automatic low noise frequency selection that uses associated delay data and bandpass data according to various embodiments.

After the low noise frequency has been selected, various components of the touch controller 106 can be adjusted based on the selected frequency to improve their operation during a touch panel scan, for example. FIG. 5 illustrates an exemplary circuit for automatic low noise frequency selection that can use associated delay data and bandpass data according to various embodiments. FIG. 5 illustrates the details of one sense channel of the receive section of the touch controller. The receive section can have multiple sense channels with similar components. In the example of FIG. 5, receive section 107 of touch controller 106 can have a sense channel that can include transimpedance amplifier 503, bandpass filter 505, and receive analog-to-digital converter (ADC) 507. The amplifier 503 can receive touch signal inputs from the touch sensor panel 124 to convert into a voltage signal. The output of the amplifier 503 can be fed to the bandpass filter 505 to reject noise components outside a particular band, e.g., components far from the fundamental frequency of the signal, about 130 kHz in some embodiments. The output of the bandpass filter 505 can be fed to the receive ADC 507 to convert to a digital signal, which can be sent from the receive section 107 to the demodulation section 109 for further processing.

Resistor LUT 520 can provide resistance adjustment (R) 522 to the feedback resistor Rfb of the transimpedance amplifier 503 to adjust the resistance associated with the selected low noise frequency. Table 3 illustrates an example resistor LUT 520 as follows,

TABLE 3

| Resistor lookup table example | |
|---|---|
| DPPC[1] | R[1] |
| DPPC[2] | R[2] |
| . | . |
| . | . |
| . | . |
| DPPC[w] | R[w] | where DPPC=the phase increment associated with the selected low noise frequency; R=the resistance adjustment for the resistor; and w=any integer.

Bandpass LUT 515 can provide bandpass adjustment (BPF_FCODE) 504 to the bandpass filter 505 to adjust the filter bandpass range to include the selected low noise frequency. Table 4 illustrates an example bandpass LUT 515 as follows,

TABLE 4

| Bandpass filter lookup table example | |
|---|---|
| DPPC[1] | BPF_FCODE[1] |
| DPPC[2] | BPF_FCODE[2] |
| . | . |
| . | . |
| . | . |
| DPPC[w] | BPF_FCODE[w] | where BPF_FCODE=the bandpass center frequency adjustment for the bandpass filter; and w=any integer.

The demodulation section 109 of the touch controller 106 can include similar components as described in FIG. 2a, for example. The demodulation section 109 can also include programmable delay 509. The programmable delay 509 can adjust the phase of a touch signal received from a sense channel to correct for delays caused by various components of the system, such as the touch sensor panel, for example, using a component DCL 508, which can represent a sum of the system delays affecting the sense channels. The phase-adjusted touch signals from all the sense channels can be fed to summer 203. In an alternate embodiment, the programmable delay 509 can be positioned after the summer 203 to receive the summed signals and phase-adjust the sum. In some embodiments, the phase adjustment can be performed during a touch panel scan and omitted during a spectral scan, e.g., where the incoming phase of the noise can be unknown.

Delay LUT 519 can connect to the programmable delay 509 to provide phase adjustment (DCL) 508 to adjust the touch signals to the selected low noise frequency. Table 5 illustrates an example delay LUT 519 as follows,

TABLE 5

| Delay lookup table example | |
|---|---|
| DPPC[1] | DCL[1] |
| DPPC[2] | DCL[2] |
| . | . |
| . | . |
| . | . |
| DPPC[w] | DCL[w] | where DCL=the phase adjustment for the programmable delay; and w=any integer.

The DCL value can also be a function of the sense channel and/or the touch scan step (i.e., the combination of stimulation signals applied to the touch sensor panel). Therefore, in order to maximize the phase adjustment to the signal (and thereby the signal gain), it can be helpful to have DCL values tailored for each channel and/or to each scan step for a given DPPC value in the frequency selection LUT 227 and its corresponding frequency. As such, the data in the delay LUT, as illustrated in Table 5, can be allocated to a per channel LUT in the delay LUT and a per scan step LUT in the delay LUT. This can present a large amount of data such that it can be inefficient or impossible to store all the data in the RAM 112. Rather, the data can be stored in internal or external low-latency memory accessible to dynamically and temporarily populate the LUT in the RAM with the per channel DCL values and/or the per step DCL values based on the selected low noise frequency.

Table 6 illustrates example DCL entries in a delay LUT, where entries for a multi-stimulation application can include a DCL value for each (channel, step) pair and a single stimulation application can include a DCL value for each (channel, row) pair.

TABLE 6

| DCL entry example | | | |
|---|---|---|---|
| DCL(0, 0) | DCL(1, 0) | . . . | DCL(x − 1, 0) |
| . | . | . . . | . |
| . | . | | . |
| . | . | | . |
| DCL(0, y − 1) | DCL(1, y − 1) | . . . | DCL(x − 1, y − 1) | where x=the number of channels; and y=the number of steps (multi-stimulation) or the number of rows (single stimulation).

Table 7 illustrates example DCL entries in a delay LUT, where entries can include a DCL value per channel for either a multi-stimulation or a single stimulation application.

TABLE 7

DCL entry example

| CH_DCL(0) | CH_DCL(1) | ... | CH_DCL(x − 1) |
|---|---|---|---| where CH_DCL=the phase adjustment for the programmable channel delay; and x=the number of channels.

Table 8 illustrates example DCL entries in a delay LUT, where entries can include a DCL value per step for a multi-stimulation application.

TABLE 8

DCL entry example

| STEP_DCL(0) | STEP_DCL(1) | ... | STEP_DCL(y − 1) |
|---|---|---|---| where STEP_DCL=the phase adjustment for the programmable step delay for a multi-stimulation application; and y=the number of steps.

Table 9 illustrates example DCL entries in a delay LUT, where entries can include a DCL value per row for a single stimulation application.

TABLE 9

DCL entry example

| ROW_DCL(0) | ROW_DCL(1) | ... | ROW_DCL(y − 1) |
|---|---|---|---| where ROW_DCL=the phase adjustment for the programmable row delay for a single-stimulation application; and y=the number of rows.

When a single channel and row/step vector is used, the total delay into a given channel can be the sum of the channel and step DCL value for multi-stimulation application or the channel and the row DCL value for single stimulation application.

Figure 6A:
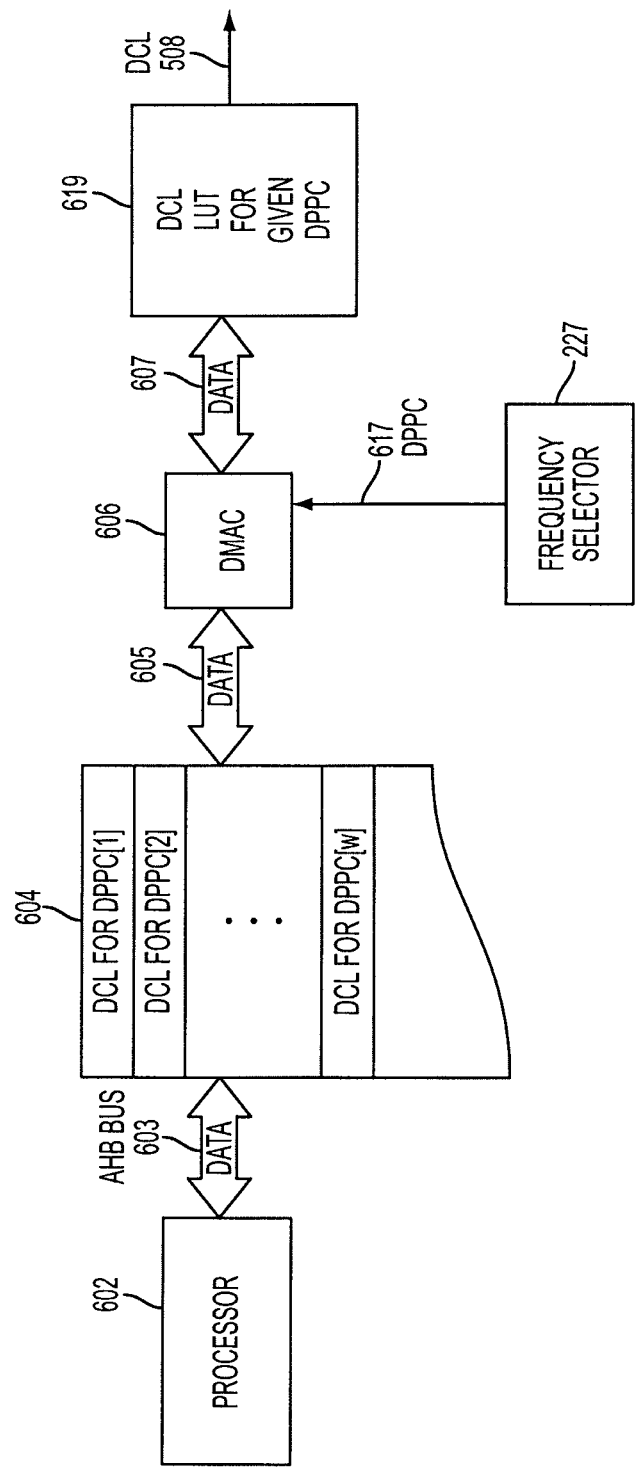
FIGS. 6a-6f illustrate exemplary memory for automatic low noise frequency selection that dynamically stores associated delay data according to various embodiments.

FIG. 6a illustrates exemplary memory for automatic low noise frequency selection that can dynamically store associated delay data according to various embodiments. In the example of FIG. 6a, processor subsystems 102 of touch controller 106 can include processor 602, data tightly coupled memory (DTCM) 604, and direct access memory (DMAC) 606. DCL LUT 619 can be an SRAM that can store DCL LUT data for a selected DPPC value associated with a low noise frequency. The DTCM 604 can store DCL LUT data for each DPPC value. The processor 602 can load the DCL LUTs via data bus 603. The DMAC 606 can access the DTCM 604 to transfer the DCL data 605 for a DPPC from the DTCM to the LUT 619 based on a selection signal 617. The selection signal generated by the frequency selector 227 can select which LUT data in the DTCM 604 to copy to the LUT 619 (data 607) based on the selected DPPC value associated with a low noise frequency.

Figure 6B:
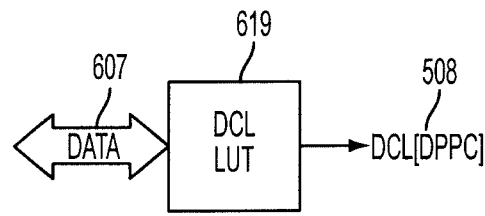
Figure 6C:
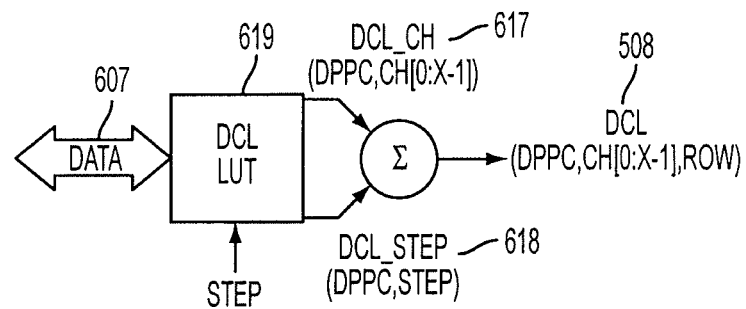
Figure 6D:
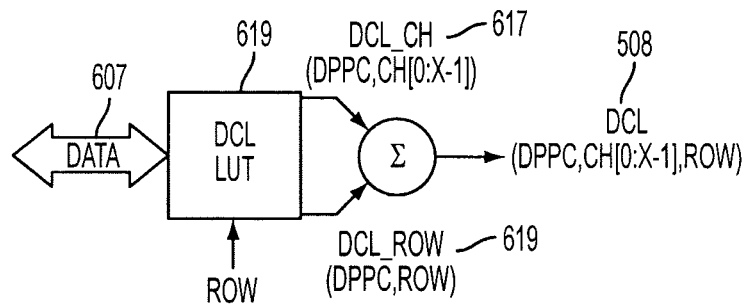
Figure 6E:
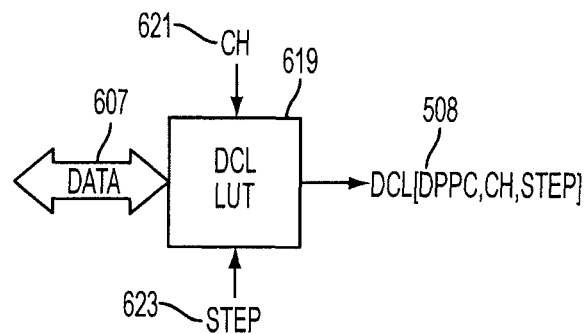
Figure 6F:
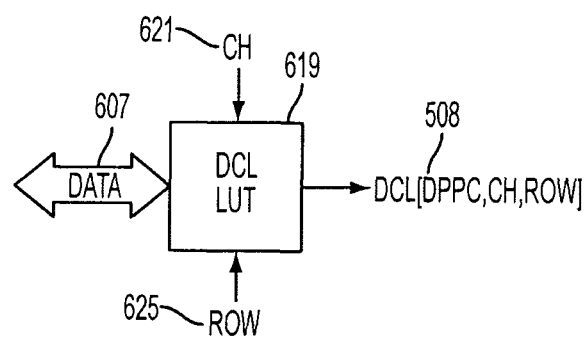

FIGS. 6a-6f illustrate exemplary DCL LUT configurations. FIG. 6b illustrates a DCL LUT configuration in which each DCL value 508 can correspond to each DPPC, as illustrated in Table 5. Such a DCL value can be universally applied to all channels and across all steps (multi-stimulation) and all rows (single stimulation). FIG. 6c illustrates a DCL LUT configuration in which there can be one DCL value 617 per channel and one DCL value 618 per step for a multi-stimulation application, as illustrated in Tables 7 and 8. The output DCL value 508 can be derived from a sum of the channel DCL value and the step DCL value. FIG. 6d illustrates a DCL LUT configuration in which there can be one DCL value 617 per channel and one DCL value 619 per row for a single stimulation application, as illustrated in Tables 7 and 9. The output DCL value 508 can be derived from a sum of the channel DCL value and the row DCL value. FIG. 6e illustrates a DCL LUT configuration in which each DCL value 508 can correspond to a (channel, step) pair for a multi-stimulation application, as illustrated in Table 6. FIG. 6g illustrates a DCL LUT configuration in which each DCL value 508 can correspond to a (channel, row) pair for a single stimulation application.

Since bandpass adjustment data can be much less than delay data, the bandpass adjustment data can be stored in the RAM 112. Alternatively, similar to the delay data, the bandpass data can be stored in the DTCM and dynamically and temporarily transferred by the DMAC to the bandpass LUT for a given DPPC value.

Configurations for the resistor LUT 520 similar to those for the delay LUT in FIGS. 6a-6f and Tables 6-9 can be realized.

Figure 7:
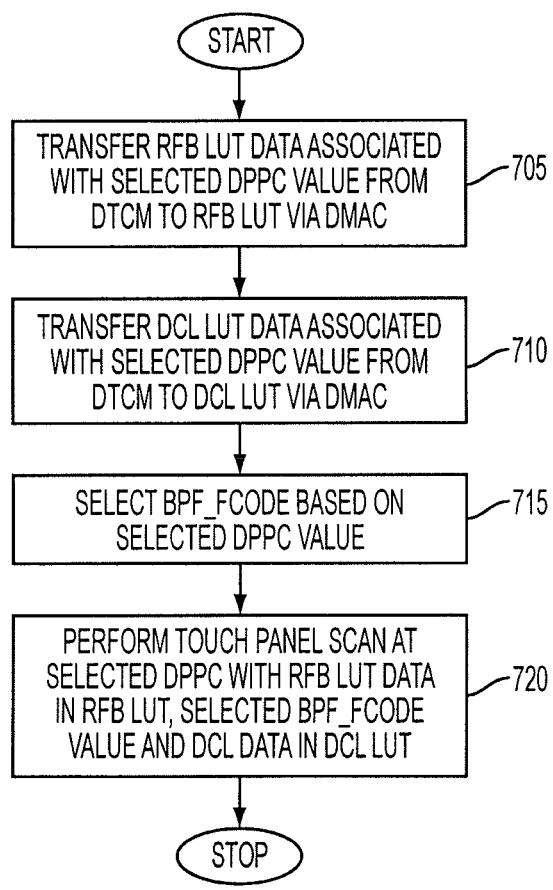
FIG. 7 illustrates an exemplary method for selecting resistance, delay, and bandpass data associated with automatic low noise frequency selection according to various embodiments.

FIG. 7 illustrates an exemplary method for selecting resistance, delay, and bandpass data associated with automatic low noise frequency selection according to various embodiments. In the example of FIG. 7, resistor (Rfb) LUT data corresponding to a selected DPPC value associated with a low noise frequency can be transferred from a DTCM to the resistor LUT (705). Similarly delay (DCL) LUT data corresponding to a selected DPPC value associated with a low noise frequency can be transferred from the DTCM to the delay LUT (710). A bandpass adjustment (BPF_FCODE) value to set the center frequency of the bandpass filter can be selected based on the selected DPPC value (715). A touch panel scan can be performed at the low noise frequency based on the selected DPPC value using the selected data from the resistor and delay LUTs and the selected bandpass adjustment value. This method can be performed in auto-scan, ready, or active mode, as well as other modes capable of performing automatic low noise frequency selection according to various embodiments.

Figure 8:
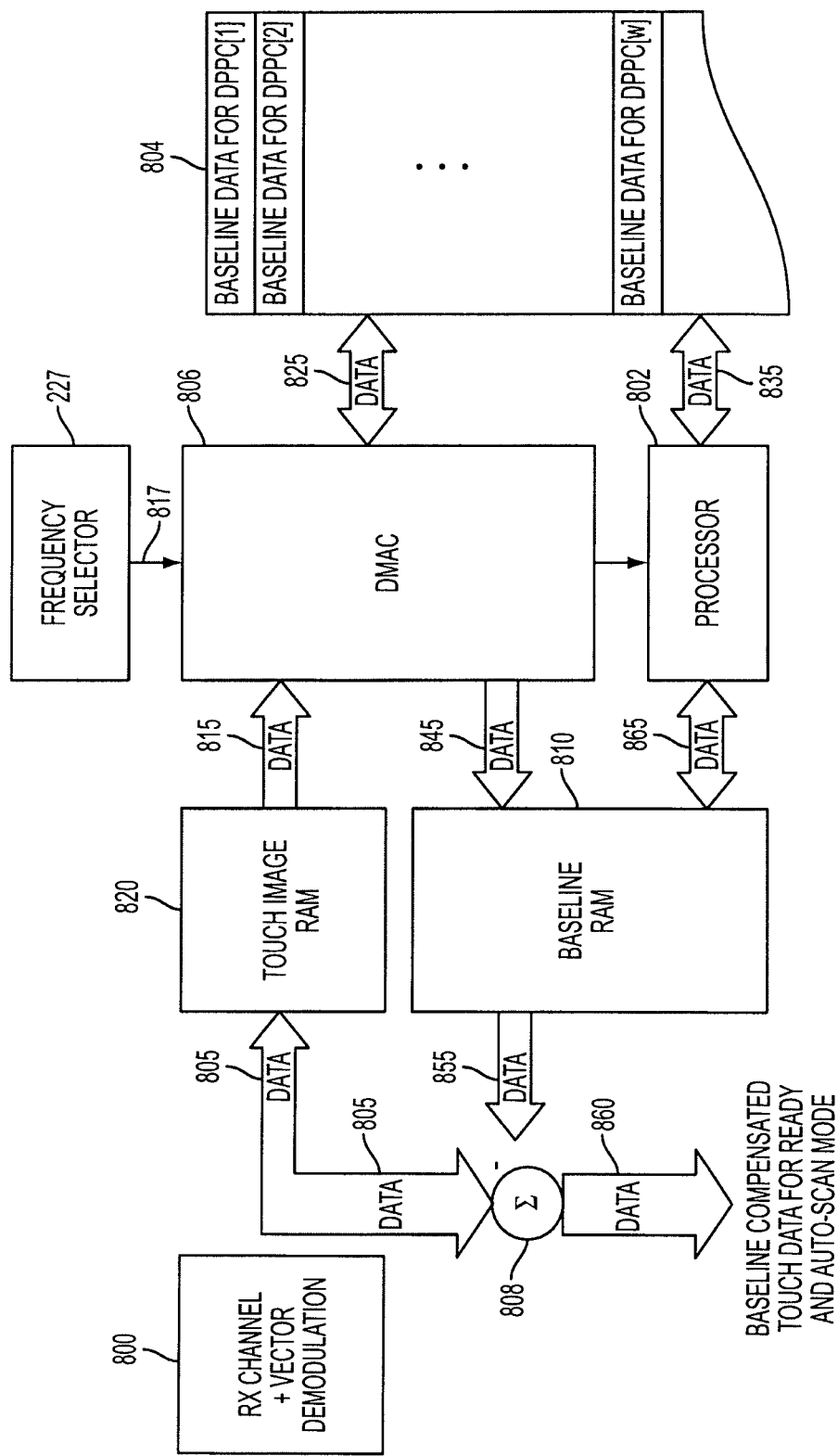
FIG. 8 illustrates exemplary memory for automatic low noise frequency selection that dynamically stores associated touch baseline data according to various embodiments.

FIG. 8 illustrates exemplary memory for automatic low noise frequency selection that can dynamically store associated touch baseline data according to various embodiments. A touch signal can have a dynamic component and a static component, the dynamic component indicative of a particular touch event, e.g., the proximity of that touch event to the touch panel, and the static component indicative of any touch event, e.g., baseline touch magnitude of all touch events. The baseline data can be a function of frequency. The baseline data can be subtracted from the touch signals sensed by the sense channels to normalize the touch signals. When there is a touch event, the normalized touch signals can show a sufficient magnitude. When there is not a touch event, the normalized touch signals can show little or no magnitude. The subtraction can be done without intervention by the processor. Since a baseline can be fairly constant, it can be useful to store the baseline in static memory and use it in touch signal calculations when needed. In the example of FIG. 8, processor subsystems 102 of touch controller 106 can include processor 802, data tightly coupled memory (DTCM) 804, direct memory access controller (DMAC) 806, and baseline memory 810. Upon completion of a touch panel scan, the DMAC 806 can transfer touch image data 815 from touch image RAM 820 based on a given DPPC (from frequency selector 227 via frequency selection signal 817) to the DTCM 804 (data 825). Multiple touch panel scans can be performed to capture baseline data in the DTCM 804 for each of the M DPPC values, each representing one of the M low noise frequencies. The baseline data stored in the DTCM 804 can then be transferred via the DMAC 806 (data 825) from the DTCM to baseline RAM 810 (data 845) based on the selected DPPC value. Subtractor 808 can subtract the baseline touch data 855 from the touch data 805 (from sense channel demodulation 800) to calculate the baseline compensated touch data (dynamic touch component) 860 for further processing. Processor 802 can access baseline data in the DTCM 804 (data 835) or in the baseline RAM 810 (data 865) without going through the DMAC 806.

Figure 9:
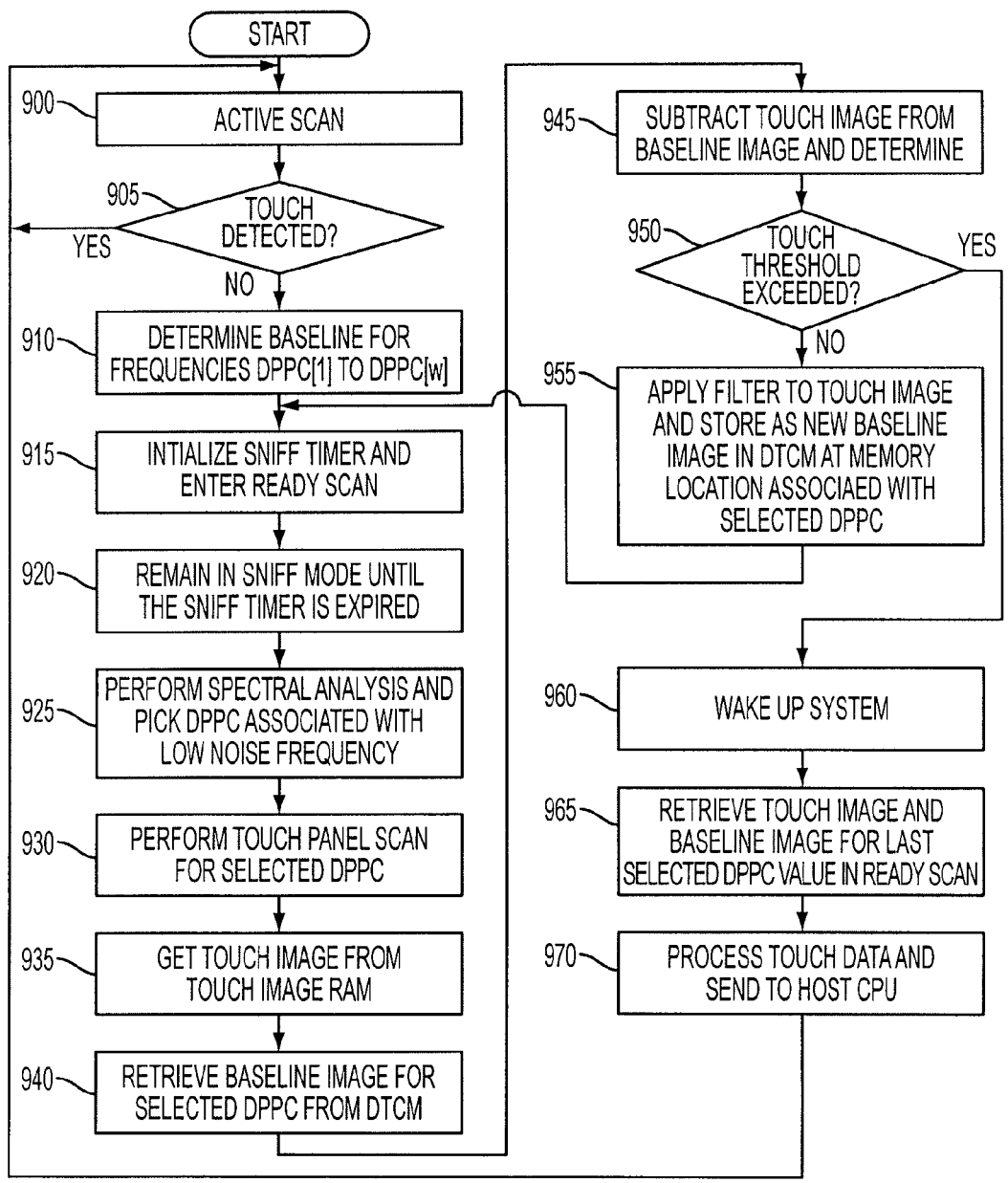
FIG. 9 illustrates an exemplary method for selecting touch baseline data associated with automatic low noise frequency selection in ready mode according to various embodiments.

FIG. 9 illustrates an exemplary method for selecting touch baseline data associated with automatic low noise frequency selection in ready mode according to various embodiments. In the example of FIG. 9, the touch system can remain in active mode where touch panel scans can be performed actively as long as a near touch or touch is detected (900). A determination can be made whether a near touch or touch has been detected (905). If no near touch or touch has been detected, the processor can determine baseline touch images for DPPC values associated with frequencies 1 to w and store the baseline touch images in a DTCM at the appropriate location (910). The touch system can initialize a sniff timer and transition into a ready scan (915). In ready scan, touch images can be captured without intervention from the processor and at longer scan intervals (e.g. at 40 ms in ready scan as opposed to 16 ms in active scan). This can allow the system to go into a lower power state, e.g., a sniff mode, while still having the ability to capture touch images. The touch system can remain in the sniff mode until the sniff timer is expired (920). In sniff mode, a high frequency clock oscillator can be off, resulting in a lowest power mode.

Upon exiting sniff mode, the touch system can perform a spectral scan and select a DPPC value associated with a low noise frequency (925). The touch system can perform a touch panel scan with the selected DPPC value (930). Upon completion of the touch panel scan, the captured touch image can be retrieved from touch image RAM (935). The baseline image associated with the selected DPPC value can be retrieved from the DTCM (940). The baseline image can be subtracted from the touch image (945) to provide a baseline compensated touch image (945). The baseline compensation touch image can be compared to a touch threshold (950). If the touch threshold is exceeded, the system can be woken up (960). The last known touch image and baseline data acquired during ready scan can be retrieved (965). Touch data can be processed and sent to a host computer (970). At that time, active scan can resume (900).

If the touch threshold is not exceeded (950), the touch image can be captured, filtered, and stored in the DTCM as the new baseline image for the selected DPPC value (955). A filter can be applied to deemphasize sudden changes in the baseline value due to noise, for example, or other effects. Resistor and delay adjustments can be selected according to FIGS. 6a-6f, for example.

Figure 10:
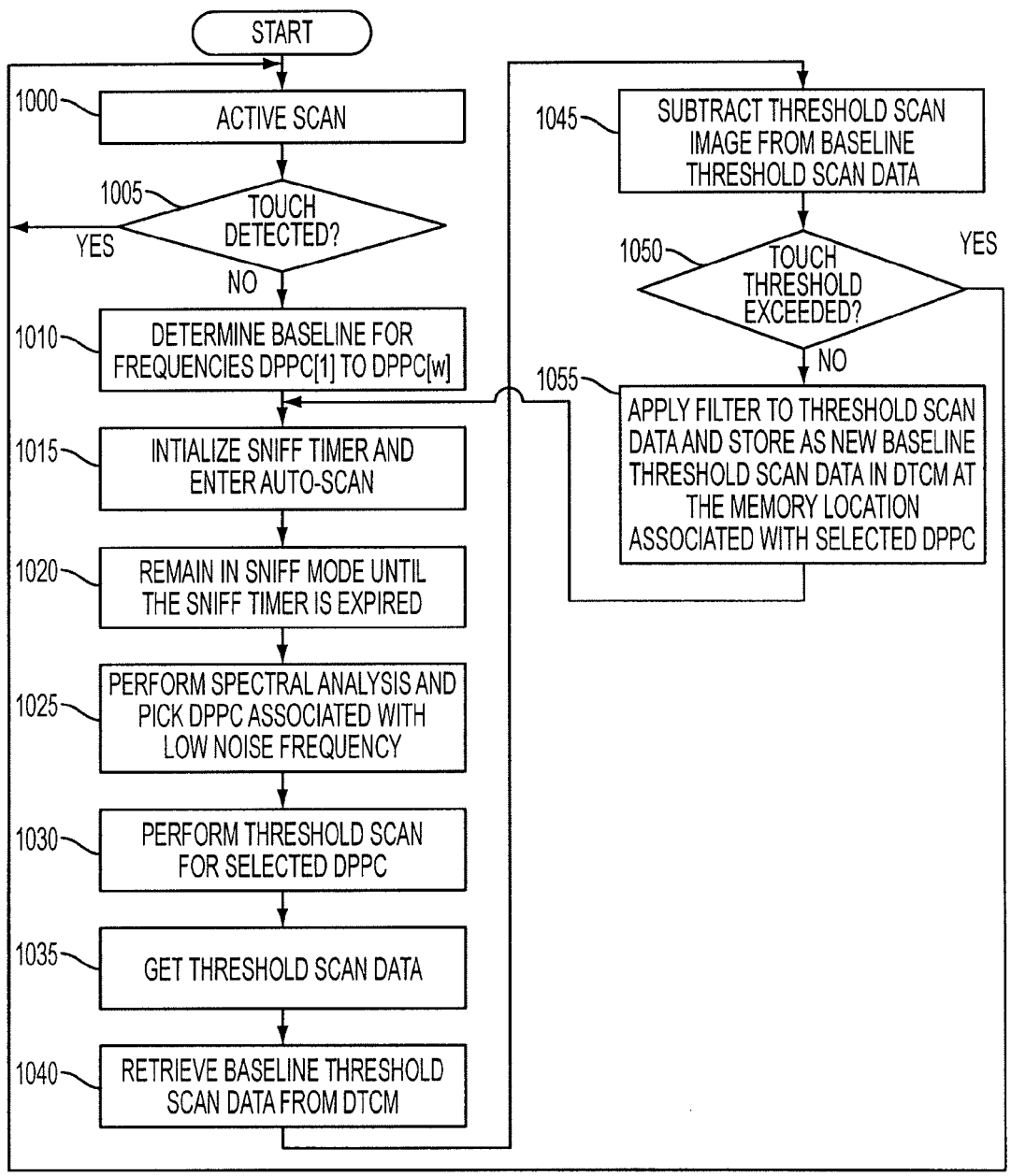
FIG. 10 illustrates an exemplary method for selecting touch baseline data associated with automatic low noise frequency selection in auto-scan mode according to various embodiments.

FIG. 10 illustrates an exemplary method for selecting touch baseline data associated with automatic low noise frequency selection in auto-scan mode according to various embodiments. In the example of FIG. 10, the touch system can remain in active mode where touch panel scans can be performed actively as long as a near touch or touch is detected (1000). A determination can be made whether a near touch or touch has been detected (1005). If no near touch or touch has been detected, the processor can determine baseline threshold scan data for DPPC values associated with frequencies 1 to w and store the threshold baseline data in the DTCM at appropriate locations (1010). The touch system can initialize a sniff timer and transition into an auto-scan (1015). In auto-scan, threshold scan data can be captured without intervention from the processor and at longer scan intervals (e.g. at 125 ms in auto-scan as opposed to 16 ms in active scan). Instead of capturing an entire touch image that can involve multiple scans (e.g. 15 scans per image), a single scan, namely a threshold scan, can be performed while driving all stimulation signal lines at the same phase and reduced amplitude. The amount of threshold scan and baseline data can be equivalent to the number of channels. This can allow the system to go into a lower power state, e.g., a sniff mode, while still having the ability to detect near touches or touches. Since the scan duration can be longer than for ready mode and a single scan can be performed in auto-scan mode, more power can be saved than in ready mode scan. The touch system can remain in the sniff mode until the sniff timer is expired (1020). In sniff mode, the high frequency clock oscillator can be off, resulting in a lowest power mode.

Upon exiting sniff mode, the touch system can perform a spectral scan and select a DPPC value associated with a low noise frequency (1025). The touch system can perform a threshold scan with the selected DPPC value (1030). Upon completion of the threshold scan, the threshold scan data can be retrieved (1035). The baseline threshold data associated with the selected DPPC value can be retrieved from the DTCM (I 040). The baseline threshold data can be subtracted from the threshold scan data (1045). The baseline compensated threshold scan data can be compared to a touch threshold (1050). A determination can be made whether the threshold is exceeded (1050). If so, the system can be woken up (1060). At that time, active scan can resume (1000). If the touch threshold is not exceeded, the threshold scan data can be captured, filtered, and stored in the DTCM as the new baseline threshold scan data for the selected DPPC value (1055). The filter can be applied to deemphasize sudden changes in the baseline value due to noise, for example, or other effects. Since a single scan can be performed in auto-scan mode, a single delay adjustment and resistor adjustment per channel can be selected, as illustrated in FIGS. 6a-6f, and used.

Figure 11:
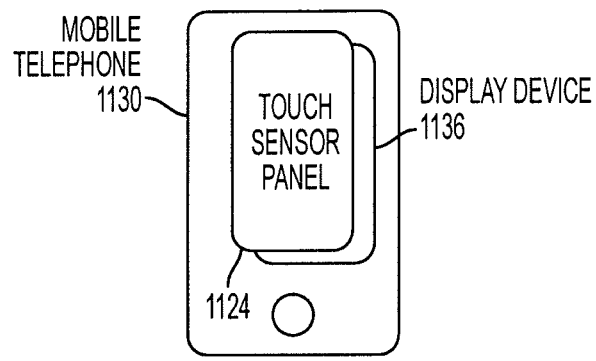
FIG. 11 illustrates an exemplary mobile telephone having automatic low noise frequency selection according to various embodiments.

FIG. 11 illustrates an exemplary mobile telephone 1130 that can include touch sensor panel 1124, display 1136, and other computing system blocks that can have automatic low noise frequency selection according to various embodiments.

Figure 12:
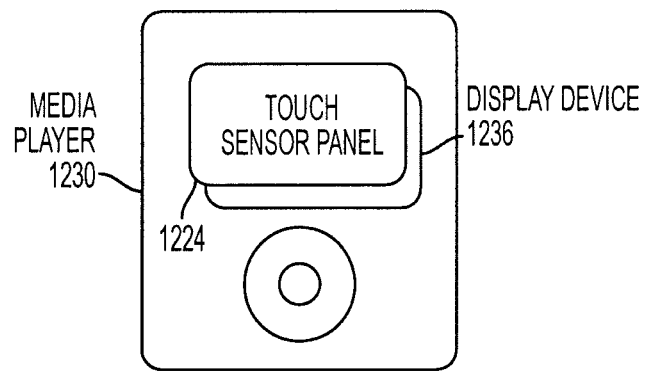
FIG. 12 illustrates an exemplary digital media player having automatic low noise frequency selection according to various embodiments.

FIG. 12 illustrates an exemplary digital media player 1230 that can include touch sensor panel 1224, display 1236, and other computing system blocks that can have automatic low noise frequency selection according to various embodiments.

Figure 13:
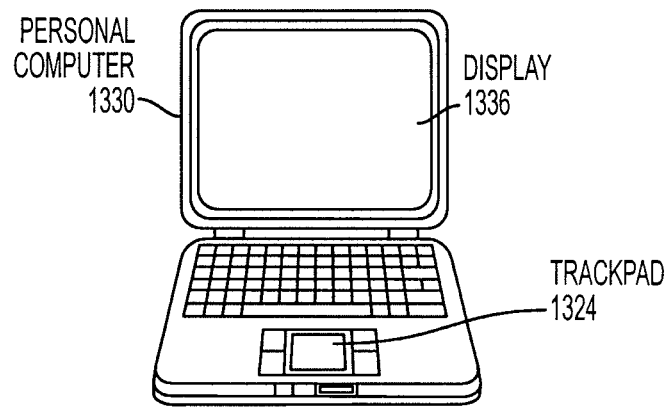
FIG. 13 illustrates an exemplary personal computer having automatic low noise frequency selection according to various embodiments.

FIG. 13 illustrates an exemplary personal computer 1330 that can include touch sensor panel (trackpad) 1324, display 1336, and other computing system blocks that can have automatic low noise frequency selection according to various embodiments.

The mobile telephone, media player, and personal computer of FIGS. 11 through 13 can realize power savings by having automatic low noise frequency selection according to various embodiments.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A circuit for automatically selecting a low noise frequency for use in a device comprising:
   a plurality of sense channels, each sense channel configured to receive a signal from a touch sensor panel;
   a summing circuit coupled to the plurality of sense channels and configured to generate a sum of the signals;
   a pair of magnitude circuits coupled to the summing circuit, one of the pair of magnitude circuits coupled to the summing circuit through a first mixer configured for demodulation with an in-phase (I) component of a demodulation frequency so as to calculate an in-phase magnitude value corresponding to an amount of noise at the demodulation frequency, and the other of the pair of magnitude circuits coupled to the summing circuit through a second mixer configured for demodulation with a quadrature (Q) component of the demodulation frequency so as to calculate a quadrature magnitude value corresponding to the amount of noise at the demodulation frequency; and frequency selection logic coupled to the pair of magnitude circuits and configured to select without intervention from a processor the demodulation frequency as a low noise frequency if the amount of noise is lower than an amount of noise at another demodulation frequency, wherein the processor is configured to identify one or more touch events on the touch sensor panel.

2. The circuit of claim 1, wherein the frequency selection logic includes a noise calculator configured to calculate without intervention from the processor the amount of noise based on the in-phase magnitude value and the quadrature magnitude value.

3. The circuit of claim 1, wherein the frequency selection logic includes a noise comparator configured to compare without intervention from the processor the amount of noise to a threshold to determine whether the amount of noise is low.

4. The circuit of claim 1, wherein the frequency selection logic includes a frequency selector configured to select without intervention from the processor the demodulation frequency as the low noise frequency.

5. The circuit of claim 1, further comprising a memory configured to store data associated with the demodulation frequency.

6. The circuit of claim 1 incorporated into at least one of a mobile telephone, a digital media player, or a personal computer.

7. A method for automatically determining a low noise frequency for demodulating a signal, comprising:
selecting a plurality of demodulation frequencies at which low noise appears in a signal received from a touch sensor panel, wherein the low noise is lower than an amount of noise appearing in the signal at another demodulation frequency;
calculating a plurality of noise magnitudes at the selected plurality of demodulation frequencies, each of the plurality of noise magnitudes based on an amount of noise in the signal at the corresponding demodulation frequency; and
determining a low noise magnitude and the corresponding demodulation frequency, the low noise magnitude being lower than a noise magnitude at another demodulation frequency and the determined demodulation frequency being used to generate further signals,
wherein the selecting, the calculating, and the determining are without intervention of a processor configured to identify one or more touch events on the touch sensor panel.

8. The method of claim 7, wherein the selecting comprises:
providing a range of demodulation frequencies;
generating a plurality of noise magnitudes of the signal at each of the provided demodulation frequencies;
sorting the plurality of noise magnitudes from lowest to highest; and
selecting the provided demodulation frequencies having the two or more lowest of the plurality of noise magnitudes to be the selected plurality of demodulation frequencies.

9. The method of claim 7, wherein the calculating comprises:
calculating an in-phase magnitude corresponding to an in-phase amount of noise in the signal at the corresponding demodulation frequency;
calculating a quadrature magnitude corresponding to a quadrature amount of noise in the signal at the corresponding demodulation frequency; and
calculating the noise magnitude at the corresponding demodulation frequency as a function of the in-phase magnitude and the quadrature magnitude.

10. The method of claim 7, wherein the determining comprises:
comparing the plurality of noise magnitudes to a threshold until one of the plurality of noise magnitudes is determined to be lower than the threshold; and
selecting the demodulation frequency corresponding to the determined noise magnitude to be used to generate further signals.

11. The method of claim 7, further comprising storing data representing the selected plurality of demodulation frequencies in a lookup table in a memory.

12. A touch sensitive device comprising:
at least one sense channel configured to sense a touch event at the device;
scan logic couplable to the at least one sense channel and configured to perform a scan sequence on the device to determine the occurrence of the touch event; and
frequency selection logic couplable to the scan logic and configured to select, without intervention from a processor configured to identify the touch event, a low noise frequency to be used during the scan sequence, the low noise frequency being a frequency at which an amount of noise is lower than an amount of noise at another frequency, and the low noise frequency being selectable from among a plurality of signal frequencies.

13. The device of claim 12, wherein the scan logic comprises spectral scan logic configured to perform the scan sequence on the device when there is no occurrence of a touch event to determine an amount of noise introduced by the device, and wherein the frequency selection logic selects the low noise frequency as the signal frequency that produces a low amount of noise during the scan sequence.

14. The device of claim 12, wherein the frequency selection logic is configured to send a signal to the processor to initiate the scan sequence by the scan logic when the selected frequency is not a frequency with low noise.

15. The device of claim 12, wherein the at least one sense channel comprises a bandpass filter to filter a touch signal indicative of the sensed touch event, and the device further comprises a memory configured to store data associated with the low noise frequency for use by the bandpass filter for filtering the touch signal.

16. The device of claim 12, further comprising a demodulation section configured to demodulate a touch signal with the low noise frequency, the touch signal being indicative of the sensed touch event, and a memory configured to store data associated with the low noise frequency for use by the demodulation section for demodulating the touch signal.

17. A circuit comprising:
a noise calculator configured to calculate a plurality of noise magnitudes, each of the plurality of noise magnitudes based on in-phase and quadrature magnitudes associated with an amount of noise at a corresponding one of a plurality of demodulation frequencies of an input signal received from a touch sensor panel, each of the plurality of demodulation frequencies selectably determined as a low noise frequency, the low noise frequency being a demodulation frequency at which a noise magnitude is lower than a noise magnitude at another demodulation frequency; and a frequency selector configured to select a low noise magnitude and the demodulation frequency corresponding to the selected low noise magnitude for operating the circuit at the selected demodulation frequency, the noise calculator and the frequency selector operable without intervention from a processor configured to identify one or more touch events on the touch sensor panel.

18. The circuit of claim 17, comprising at least one sense channel configured to transmit the input signal, the at least one sense channel having a gain.

19. The circuit of claim 18, comprising a noise scaler configured to scale the plurality of noise magnitudes to account for frequency dependencies associated with the gain of the at least one sense channel.

20. The circuit of claim 18, wherein the at least one sense channel is configured to bypass one or more components of the at least one sense channel to account for frequency dependencies associated with the gain of the at least one sense channel.

21. The circuit of claim 17, comprising a math engine including
a single multiplier configured to perform demodulation, scaling, and squaring of the input signal, and
a single accumulator configured to accumulate the in-phase and quadrature magnitudes and to accumulate phase data for an oscillator function.

22. The circuit of claim 17, wherein the frequency selector is configured to periodically reorder the plurality of noise magnitudes when the amount of selection processing reaches a defined level.

23. A method comprising:
selecting a low noise frequency for operating a device, the low noise frequency being a frequency at which an amount of noise is lower than an amount of noise at another frequency;
dynamically populating a memory with data corresponding to the selected low noise frequency, the data selectable from another memory comprising a plurality of data associated with a plurality of low noise frequencies; and
selecting from the memory at least a portion of the data to apply to the device for operating the device at the low noise frequency to detect one or more touch events on a touch sensor panel,
wherein the selecting the low noise frequency, the dynamically populating, and the selecting from the memory are without intervention of a processor configured to identify the one or more touch events on the touch sensor panel.

24. The method of claim 23, wherein the data comprises phase adjustments to signals having the low noise frequency to correct for signal delays, and wherein the dynamically populating the memory comprises populating a lookup table in the memory with the phase adjustments.

25. The method of claim 23, wherein the data comprises baseline data to be subtracted from signals having the low noise frequency to normalize the signals, and wherein the dynamically populating the memory comprises populating the memory with the baseline data.

* * * * *